US010929666B2

(12) United States Patent
Bossut et al.

(10) Patent No.: US 10,929,666 B2
(45) Date of Patent: Feb. 23, 2021

(54) SYSTEM AND METHOD FOR PROVIDING AUGMENTED REALITY INTERACTIONS OVER PRINTED MEDIA

(71) Applicants: Christophe Bossut, Vernon (FR); Guy Le Hénaff, Paris (FR); Yves Chapelain De La Villeguerin, Lisbon (PT)

(72) Inventors: Christophe Bossut, Vernon (FR); Guy Le Hénaff, Paris (FR); Yves Chapelain De La Villeguerin, Lisbon (PT)

( * ) Notice: Subject to any disclaimer, the term of this patent is extended or adjusted under 35 U.S.C. 154(b) by 293 days.

(21) Appl. No.: 15/759,516

(22) PCT Filed: Sep. 12, 2016

(86) PCT No.: PCT/CA2016/051075
§ 371 (c)(1),
(2) Date: Mar. 12, 2018

(87) PCT Pub. No.: WO2017/041187
PCT Pub. Date: Mar. 16, 2017

(65) Prior Publication Data
US 2019/0147246 A1 May 16, 2019

Related U.S. Application Data

(63) Continuation of application No. 62/217,141, filed on Sep. 11, 2015.

(51) Int. Cl.
*G06K 9/00* (2006.01)
*H04L 12/16* (2006.01)
(Continued)

(52) U.S. Cl.
CPC ......... *G06K 9/00671* (2013.01); *G06F 16/00* (2019.01); *G06F 16/538* (2019.01);
(Continued)

(58) Field of Classification Search
None
See application file for complete search history.

(56) References Cited

U.S. PATENT DOCUMENTS

| 8,565,474 B2 | 10/2013 | Radakovic et al. |
| 8,605,141 B2 | 12/2013 | Dialameh et al. |

(Continued)

FOREIGN PATENT DOCUMENTS

WO    2014195945 A1    12/2014

OTHER PUBLICATIONS

International Searching Authority, "International Preliminary Report on Patentability for PCT Application No. PCT/CA2016/051075, Foreign Counterpart to U.S. Appl. No. 15/759,516", dated Jan. 11, 2018, pp. 1-11, Published in: WO.

(Continued)

*Primary Examiner* — Matthew C Bella
*Assistant Examiner* — Brian D Shin
(74) *Attorney, Agent, or Firm* — Fogg & Powers LLC

(57) ABSTRACT

The present document describes a system and method for providing augmented reality interactions with printed media, whereby a user looking at a printed media (physical or electronic) with their portable computing device may view augmented reality interactions on their portable device to enrich the media being viewed. The method includes recognizing pages and using interaction capabilities offered atop the page once recognized. The system is also configured to perform an image recognition process which allows for a very quick detection of a preregistered image from the database which matches the image of the page viewed by the user in order to extract the assets associated with the prestored image and send them to the portable device for display.

21 Claims, 20 Drawing Sheets

(51) Int. Cl.
  *G06K 9/62* (2006.01)
  *G06F 16/00* (2019.01)
  *G06K 9/46* (2006.01)
  *H04L 12/58* (2006.01)
  *G06F 16/951* (2019.01)
  *G06F 16/538* (2019.01)
  *G06K 9/32* (2006.01)

(52) U.S. Cl.
  CPC ....... *G06F 16/951* (2019.01); *G06K 9/00463* (2013.01); *G06K 9/00469* (2013.01); *G06K 9/00483* (2013.01); *G06K 9/3275* (2013.01); *G06K 9/4633* (2013.01); *G06K 9/62* (2013.01); *G06K 9/6201* (2013.01); *H04L 12/16* (2013.01); *H04L 51/32* (2013.01); *G06K 2209/01* (2013.01); *G09G 2370/027* (2013.01)

(56) References Cited

U.S. PATENT DOCUMENTS

| | | | |
|---|---|---|---|
| 2008/0002893 A1* | 1/2008 | Vincent | G06K 9/3258 382/229 |
| 2009/0019039 A1 | 1/2009 | Brindley et al. | |
| 2009/0028440 A1* | 1/2009 | Elangovan | G06T 7/248 382/216 |
| 2011/0102605 A1 | 5/2011 | Hannaford | |
| 2011/0222773 A1* | 9/2011 | Radakovic | G06K 9/00469 382/182 |
| 2012/0128251 A1 | 5/2012 | Petrou et al. | |
| 2013/0073988 A1 | 3/2013 | Groten et al. | |
| 2013/0076788 A1 | 3/2013 | Ben Zvi | |
| 2015/0169951 A1 | 6/2015 | Khintsitskiy et al. | |
| 2015/0227796 A1* | 8/2015 | Holzschneider | G06F 16/51 382/103 |
| 2015/0254507 A1* | 9/2015 | Lin | G06F 16/5846 382/176 |
| 2016/0275441 A1* | 9/2016 | Barber | G06Q 10/083 |

OTHER PUBLICATIONS

International Searching Authority, "International Search Report for PCT Application No. PCT/CA2016/051075, Foreign Counterpart to U.S. Appl. No. 15/759,516", dated Nov. 10, 2016, pp. 1-4, Published in: WO.

* cited by examiner

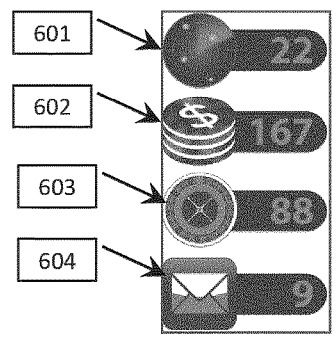
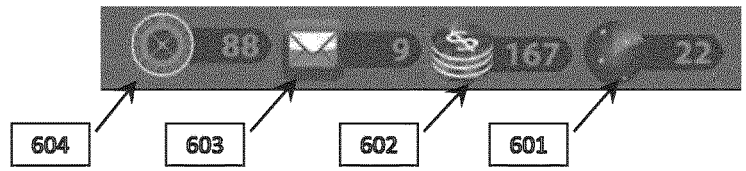
FIGURE 5a
FIGURE 5b
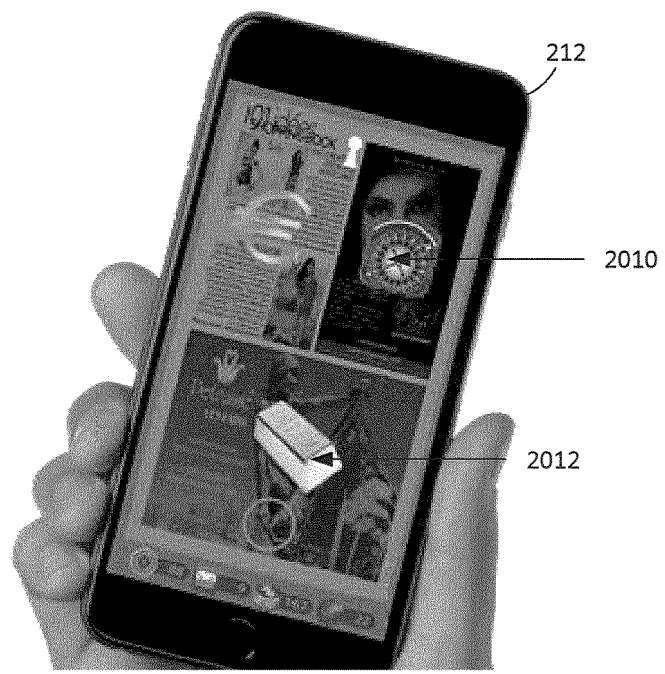
FIGURE 6

"Being in my 16th season, going to my third Super Bowl, I know how hard it is to get there," Manning said.

Especially this time.

He's less than three years removed from being unable to throw a football because of his surgically ravaged neck and nerve endings, and a bit over a year has passed since a devastating loss to Baltimore derailed what looked like a Super Bowl trip in his comeback season.

FIGURE 7a

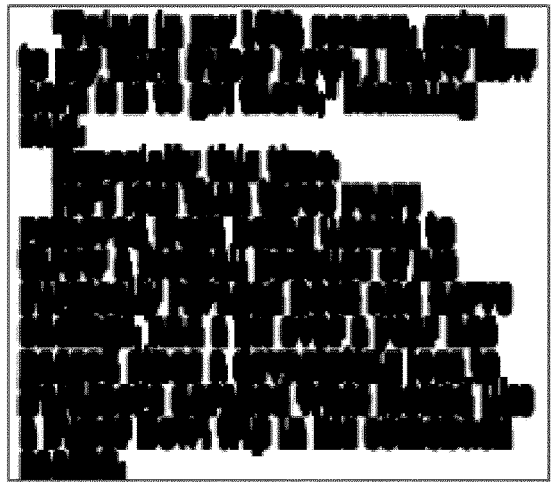

FIGURE 7c

SYSTEM AND METHOD FOR PROVIDING AUGMENTED REALITY INTERACTIONS OVER PRINTED MEDIA

This application claims priority to International Patent Application No. PCT/CA2016/051075 filed on Sep. 12, 2016 which claims priority to U.S. patent application Ser. No. 62/217,141 filed on Sep. 11, 2015.

BACKGROUND

(a) Field

The subject matter disclosed generally relates to systems and methods for providing augmented reality interactions over printed media.

(b) Related Prior Art

Books and magazine publishers (in general printed media which is of a static nature) are facing numerous challenges when their media is compared to what are the trends amongst media and capabilities offered by the internet.

The first challenge is related to the evolution of the user experience. The web uses a hyper-navigation style, across pages, and even across sites, with extensive usage of search capabilities within the search engine and/or as part of social networks. By contrast, books and magazines do not currently offer such capability and the content thereof is static.

Attempts have been made to address this problem by providing a data matrix like a QR code which allows for linking the printed matter to a website for more information about the subject being read. However, the Data Matrix has to appear on the page, thus, leaving a negative impact on the look of the page, and limiting the number and size of data matrices that can be provided on the page, in addition to limiting the space for the text that is intended to exist on the page.

Therefore, there is a need for a system and method which allows for providing some online interactions without affecting the appeal or looks of a printed page by adding data matrices and the like.

SUMMARY

The embodiments describe a system and method for providing augmented reality interactions with a static printed media directly, including recognizing pages and using interaction capabilities offered atop the view once recognized.

The major technical challenge is how to render the system quick enough to recognize the page and obtain the assets to display them atop the page, to make the user experience enjoyable and avoid making the user wait for long before starting to see the assets associated with the page that they are viewing, Aside from page recognition and interaction capabilities, the other challenge is how to make the system self-sustainable with respect to operations costs. In other words, one of the challenges is the cost associated with operating such model especially when dealing with traditional editorial parts. The editorial part is the fundamental reason of the existence of the media where the cost of operation for writing and printing is barely balanced by the revenues from subscription and sales. Adding digital enrichment services like Augmented Reality is then an additional cost to bear atop the production cost.

Also the cost of the digitally enriched version of the printed media is only loosely coupled to the number of users. The operating cost of servers and absolute profits are nearly the same for one user that checks the enriched version for 10 second or for 1 million readers who view the content for hours. These costs are even made higher due to the expectation of users to also be more up to date so that edition costs do raise again the operating cost beyond reasonable limits as user shift from the printed version to the web version (or to another web published channels).

Therefore, the embodiments describe a system and method which allow for balancing the costs of the enriched version with the profit generated through the enriched version. In a non-limiting example the system may be configured whereby the profit is based on the number of users and the time and assiduity of the users.

In an embodiment, the apparatus may offer some sort of free access to users, who upon liking the features may want to pay to extend their use/access of the features offered in the enriched version. Accordingly, a system is embedded which manages the costs and revenues in real-time in order to ensure continuity of the service. In a non-limiting example, the system may be configured to manage the operating cost by charging users that are ready to pay for it, or to spend indirect time over ads which in turn allows to charge advertisers a decent price for the work done by the editor. The advertiser is usually looking for ways to find users that could be interested by their products/services and having deeper feedback about product selection.

It must be reminded that the essence of the vast majority of publications is in the content of the editorial part and not in the advertisement part. By using such apparatus the editors would be able to allot a dramatically bigger budget to enrich the edition and pay for the artwork, while the editorial part itself has a cost of manufacturing already accounted for. This allows a single edition/manufacturing process, reducing or even replacing the need for a web version. At the same time these focused enrichments increase the quality of the reading experience which in turn will lead to attract more users. Provision of augmented reality interactions over printed media in the manner described herein may render the experience more enjoyable and boost sales. The embodiments describe a method of interaction that requires the printed version to exist, so that the user is able to interact only when they acquire the printed publication, de-facto boosting sales of the main revenue sources for the publisher.

As explained above the real difficulty for the operator; group of publishers, is in the difference between the financial models of income from printed matter compared to the operation cost of online matter like the World Wide Web. Although lead by the web mind set of being mostly free, the expected revenues should come from the success of the recognition of certain parts of documents. Revenues should increase because of the need to use printed matter hence need to buy the paper version. But revenues should also increase because of advertisements relating to these recognitions which offer another fundamental leverage for the editor because of the explicit interest shown by user for the advertised product. Which interest is also interest and trackable and measurable which allows for a more precise explanation of impact to the advertiser who in turn becomes more easily inclined to consider another publication for their ads.

This information is very valuable to advertisers in the light of social network advertisement and predicted analysis (big data). User-centric reading information and signals are now of a higher value than a statistical analysis from the display of an advertisement. Additionally new revenue may come from the sales of real game experience, or more simply from the sales of the right to play to allow users to overuse the system within a certain allocated time.

However this approach of giving a life to a document after it has been printed generates a strong speculation about the reality of the return on investment, especially in comparison with printed matters that have a fixed cost of operation (edit, print and distribute) while an enriched dynamic document especially where the user had a positive recognition of image (a win) relying on an Augmented Reality method using SaaS have important operating cost due mainly to the supplier of the image identification service.

Therefore, to allow the economic model to directly link the new operating cost with the volume of usage, the apparatus may use one or more of: a set of game rules, a set of operational research (OR) tools grouped in an OR engine on the server coupled with an AI system, and a set of robots aimed at assisting automated augmentation and enrichment of page. This automated enrichment may be done by gathering augmentation from various origins, with light constraints on format to exchange the important meta data and robot tools that interpret the documents and manufacture assets that are ready for action under the control of the OR engine.

According to an embodiment, there is provided a computer implemented method for providing augmented reality interactions over printed media, the method comprising: Receiving an image of a page from a remote device; comparing the image to pre-stored images of pages; Upon finding a match, sending a set of assets for display on the remote device on top of the image; whereby a user may view and interact with the assets as if the assets exist on the page.

The following terms are defined below.

Printed media includes media which is either printed on a physical medium such as a paper and also includes media which is displayed on a electronic monitor/screen, projections of light over a physical object e.g. wall or the like; billboard etc.

Digest: is the information that the portable device sends to the server. The digest is a type of information that represents the page that is being captured by the camera of the computing device. The format of the digest can vary between a jurisdiction and another depending on the copyright and intellectual property laws in the jurisdiction(s) in which the embodiments are being practiced. For example, the digest may be the image itself (when no copyrights exist) or data representing anchor points or identification points that identify the digest of a given page form other digests of other pages. For example, the digest may include identification/coordinates of two or more anchor points in the page and an equation calculating the distance/ratio between those points etc. The other term in use in the image processing science for the digest is image descriptor. It must be noted that the image digest designed within the embodiments is made in a way that make impossible the reconstruction of the page from the digest (As explained this is a constraint needed by the copyright laws in effect in many countries).

In an aspect, there is provided a computer implemented method for providing augmented reality interactions over printed media. The method comprises: receiving, at a server, an image of a page which is viewed on a remote device; comparing the received image to pre-stored images of pages, said pre-stored images having assets associated therewith stored in a memory device; upon finding a match, sending a set of assets to the remote device for display on top of the image; whereby a user may view the assets on the remote device and interact with the assets as if they virtually exist on the page.

In an embodiment, the printed media is provided on a physical medium.

In an embodiment, the printed media represents an electronic page having a PDL which is rendered on a display.

In an embodiment, comparing the received image to pre-stored images comprises: applying a first recognition algorithm whose output includes a plurality of potential matches for the received image, the potential matches including images showing an optical similarity to the received image; and applying a second recognition algorithm for detecting, from the plurality of potential matches, a single match for the received image, the second algorithm being adapted to detect a common text-based object in the candidate image and one of the potential matches.

In an embodiment, there is further provided generating the set of assets for display atop the image including: analyzing a PDL of an electronic page of a document; extracting semantical information of the text meta information, and web links; creating assets based on the extracted information.

In an embodiment, creating assets comprises: sending at least a portion of the extracted information to a remote search engine; receiving a set of search results in response to the sending; generating assets based on the received search results.

In an embodiment, there is further provided filtering the received search results in accordance with one or more of: 1) business rules matching requirements of a publisher associated with the page for which the image was taken, 2) parental control settings, 3) intellectual property/restrictions associated with the search results.

In an embodiment, there is further provided associating a popularity score to each of: an asset, the page, a publication including the page, and a provider associated with a given asset.

In an embodiment, there is further provided: when the popularity score of a given asset increases, applying a set of time sensitive propagation rules to spread a first portion of a popularity of the given asset to the page on which the asset is displayed, and a second portion of the acquired popularity to the provider of the asset.

In an embodiment, the propagation rules apply a Rehology concept of propagation of thick fluids whose coefficient of thickness changes with time.

In an embodiment, an asset created by a member of a social media group is selectively shared by the member within the social media group for use by other group members.

In an embodiment, there is further provided providing an incentive system whereby users may gain points for following a publication and lose points for each successful scan of an image which allows access to the set of assets associated with the page.

In an embodiment, the set of assets for a given page are specific to a given user based on pre-evaluated user interests.

In an embodiment, the pre-evaluated user interests are extracted from a list of followed interests on a social network and/or a monitored user activity.

In an embodiment, the set of assets allow the user to perform one or more of: accessing additional information; sharing things with others; obtaining rewards; annotating publications.

In an embodiment, there is further provided increasing user counters of points in exchange of a monetary value.

In an embodiment, there is further provided: receiving pre-prepared assets for inclusion into the set of assets; inserting the pre-prepared assets in the set of assets.

In an embodiment, comparing the image comprises: applying an image recognition service whose output includes a subset of candidate matches, said candidate matches including images showing optical similarity to the received image; applying a paragraph-based pattern recognition algorithm adapted to select a single candidate match from the subset of candidate matches based on the presence of a paragraph having the same pattern in the received image and one of the candidate matches.

In an embodiment, the paragraph based pattern recognition comprises: identifying a paragraph of text within the image; processing a section of the image delimiting the paragraph to find major word spaces and line endings; converting the pattern and line endings to a digital description that allows for searching pre-stored similar digital descriptions.

In an embodiment, searching for pre-stored digital descriptions comprises applying a local sensitivity hashing method for identifying a closest match for the pattern of the paragraph.

In an embodiment, comparing the image comprises: applying an image recognition service whose output includes a subset of candidate matches, said candidate matches including images showing optical similarity to the received image; applying a word-based pattern recognition algorithm adapted to select a single candidate match from the subset of candidate matches based on the presence of a similar words in the received image and the PDL of one of the candidate matches.

In an embodiment, comparing the image comprises: applying an image recognition service whose output includes a subset of candidate matches, said candidate matches including images showing optical similarity to the received image; applying an image-based pattern recognition algorithm adapted to select a single candidate match from the subset of candidate matches based on the presence of a similar words in the received image and the PDL of one of the candidate matches.

In an embodiment, sending a set of assets for display comprises sending a pre-stored image of the exact page including the set of assets.

In an embodiment, sending a set of assets for display is on top of the existing video feed.

In an embodiment, there is further provided applying a tracking method for moving the assets on the display following the image's movement due to user's movement over the page.

In another aspect, there is provided computing device having access to computer readable statement and instructions for implementing the method providing augmented reality interactions over printed media, which comprises: receiving, at a server, an image of a page which is viewed on a remote device; comparing the received image to pre-stored images of pages, said pre-stored images having assets associated therewith stored in a memory device; upon finding a match, sending a set of assets to the remote device for display on top of the image; whereby a user may view the assets on the remote device and interact with the assets as if they virtually exist on the page.

In another aspect, there is provided a computer implemented method for providing augmented reality interactions over printed media, the method comprising: receiving a digest of an image of a page which is viewed on a remote device; comparing the received a digest of image to pre-stored digests of images of pages, said pre-stored digests having assets associated therewith stored in a memory device; upon finding a match, sending a set of assets to the remote device for display on top of the image; whereby a user may view and interact with the assets as if they virtually exist on the page.

In another aspect, there is provided a computer implemented method for image recognition, comprising: receiving a candidate image for comparison against a plurality of pre-stored images; applying a first recognition algorithm whose output includes a plurality of potential matches for the candidate image, the potential matches including images showing an optical similarity to the candidate image; applying a second recognition algorithm for detecting, from the plurality of potential matches, a single match for the candidate image, the second algorithm being adapted to detect a common text in the candidate image and one of the potential matches.

In an embodiment, there is further provided running the first recognition algorithm and the second recognition algorithm in parallel for expediting detection of the single match.

In an embodiment, the first recognition algorithm is an image recognition service provided by a third entity.

In an embodiment, the second recognition algorithm uses a paragraph based pattern recognition, the second recognition algorithm being adapted to detect the single match for the candidate image based on a presence of a paragraph having the same pattern in the candidate image and one of the potential matches.

In another aspect, there is provided a computer implemented method for image recognition, comprising: receiving a candidate image for comparison against a plurality of pre-stored images; applying a first recognition algorithm whose output includes a plurality of potential matches for the candidate image, the potential matches including images showing an optical similarity to the candidate image; applying a second recognition algorithm for detecting, from the plurality of potential matches, a single match for the candidate image, the second algorithm being adapted to detect a common object in the candidate image and one of the potential matches.

In an embodiment, the first recognition algorithm is an image recognition service known as Qualcomm Vuforia.

In an embodiment, the second recognition algorithm uses a paragraph based pattern recognition, the second recognition algorithm being adapted to select the single match for the candidate image based on a presence of a paragraph having the same pattern in the candidate image and one of the potential matches.

In an embodiment, the paragraph based pattern recognition comprises: identifying a paragraph of text within the image; processing a section of the image delimiting the paragraph to find major word spaces and line endings; converting the pattern and line endings to a digital description that allows for searching pre-stored similar digital descriptions.

In an embodiment, searching for pre-stored digital descriptions comprises applying a local sensitivity hashing method for identifying a closest match for the pattern of the paragraph.

In an embodiment, the second recognition algorithm uses a word based recognition, the second recognition algorithm being adapted to select the single match for the candidate image based on a presence of same words in the candidate image and in a PDL of the potential matches.

In an embodiment, the second recognition algorithm uses a coarse character based recognition, the second recognition algorithm being adapted to select the single match for the candidate image based on a presence of a coarse recognition of character shapes in the candidate image and in a PDL of the potential matches.

In an embodiment, the second recognition algorithm uses an aspect of separation based recognition, the second recognition algorithm being adapted to select the single match for the candidate image based on a presence of similar separations between words of a given paragraph in the candidate image and in a PDL of the potential matches.

In an embodiment, analyzing a separation between words is done on a line by line basis, looking downward of a current line and its word spaces to examine relative position of nearest word spacing on another line below the current line.

In an embodiment, the second recognition algorithm analyzes a relative length of an alternance of words like and space like patterns on a line or a group of lines, such alternance defining a unique pattern that is searched for in the potential matches to select the single match.

In an embodiment, a distortion is applied to the candidate image before comparing it to the pre-stored images, to compensate for natural curvature of flexible medium aimed at, wherein the distortion pattern is inverted using interpolation image distortion where nodes of an interpolation net are accumulation points of a Hough transform.

In an embodiment, each candidate image that is overexposed is diagnosed using a frequency analysis in a low saturation area to determine an ellipsoidal shape of gradient of saturation where a frequency analysis has a predominance of low frequencies which allows to adjust parameters that fit a best ellipsoid matching theses low frequencies and where this ellipsoid allows to determine a tonal correction in this area.

In an embodiment, the tonal adjustment is replaced by a whitening of the zone to decrease creation of features that would wrongfully be interpreted or used by the first image recognition algorithm.

In an embodiment, the parameter needed for the tonal adjustment is analyzed to determine that a warning should be sent to the user requesting for a better pickup of the candidate image.

In an embodiment, there is further provided running the first recognition algorithm and the second recognition algorithm in parallel for expediting detection of the single match.

In another aspect, there is provided a computing device having access to computer readable statement and instructions for implementing the method for image recognition comprising: receiving a candidate image for comparison against a plurality of pre-stored images; applying a first recognition algorithm whose output includes a plurality of potential matches for the candidate image, the potential matches including images showing an optical similarity to the candidate image; applying a second recognition algorithm for detecting, from the plurality of potential matches, a single match for the candidate image, the second algorithm being adapted to detect a common object in the candidate image and one of the potential matches.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 5a illustrates an example of the counters system in a vertical mode, and FIG. 5b illustrates an example of the counters system in a horizontal mode;

FIG. 6 shows an example of a sponsor oriented screen;

FIGS. 7a to 7d illustrate an example of an image identification method using an overall paragraph aspect analysis;

It will be noted that throughout the appended drawings, like features are identified by like reference numerals.

DETAILED DESCRIPTION

The present document describes a system and method for providing augmented reality interactions with printed media, whereby a user looking at a printed media (physical or electronic) with their portable computing device may view augmented reality interactions on their portable device to enrich the media being viewed. The method includes recognizing pages and using interaction capabilities offered atop the page once recognized. The system is also configured to perform an image recognition process which allows for a very quick detection of a pre-registered image from the database which matches the image of the page viewed by the user in order to extract the assets associated with the pre-stored image and send them to the portable device for display.

The embodiments may be used with printed matter on paper (first embodiment) and also on-screen matters (second embodiment) such as PDF files and the like. The first embodiment is aimed at printed matter whereby the user may use a portable computing device having a camera to take picture/video/image stream of the printed matter to experience the augmented reality interactions. The secondary embodiment allows users to interact with on screen matters aimed at being printed, such as PDF files having an electronic page description (PDL). Such files may be enriched and equipped with the same interaction capabilities. However, the image identification is simplified and expected to be the display pages. In variation of the second embodiment, the preferred mode of operation may involve use of a pointing device such a finger on a touch sensitive display, a mouse, joystick and the like.

The following paragraphs explain the first embodiment which deals with the most difficult step being the image identification of the printed media received from the user's device with available printed media for which augmented reality data exists on the server. The additional steps apply to both embodiments.

Figure 1:
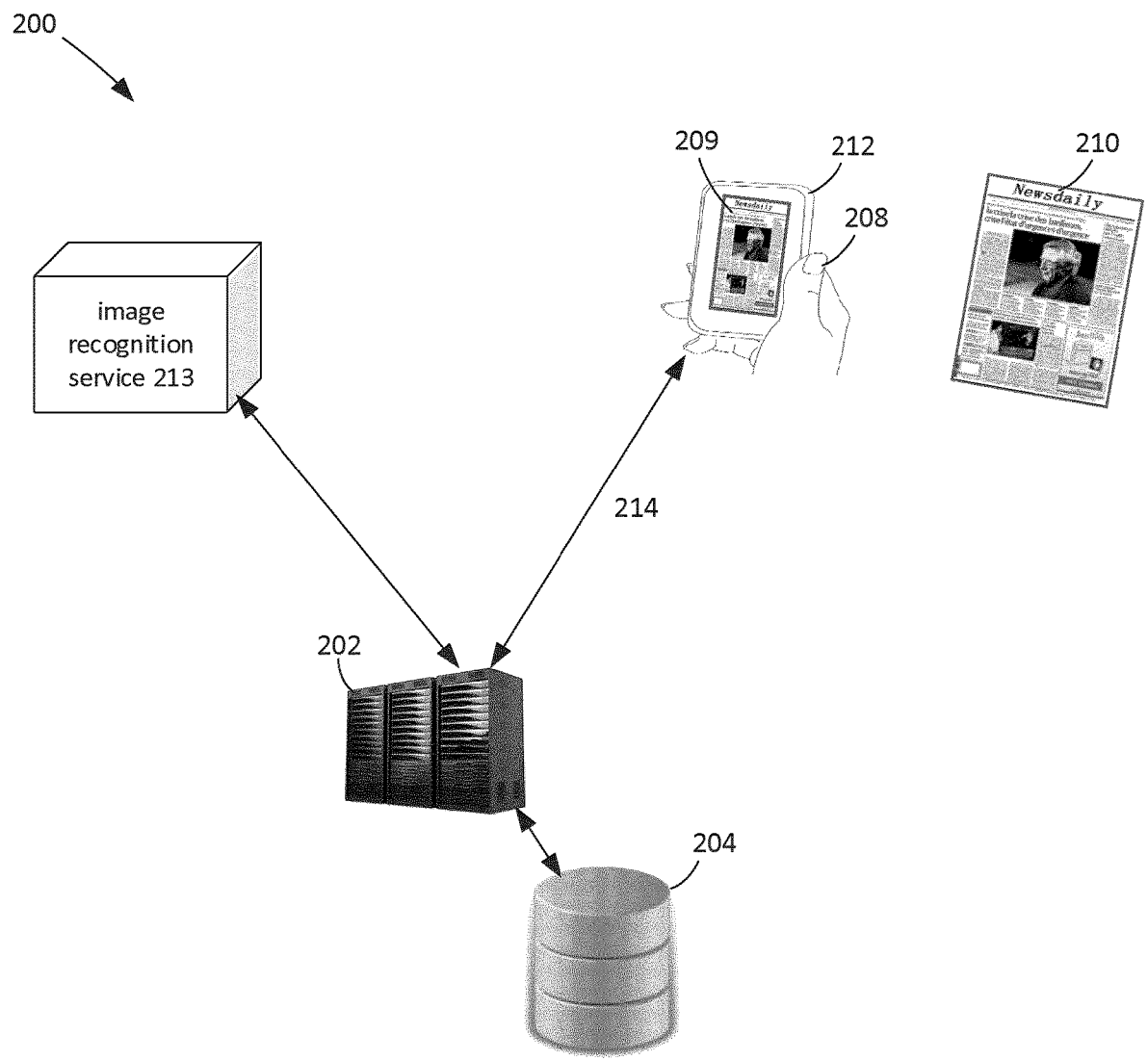
FIG. 1 illustrates an exemplary system for providing augmented reality interactions over printed media, in accordance with an embodiment.

FIG. 1 illustrates an exemplary system for providing augmented reality interactions over printed media, in accordance with an embodiment. As shown in FIG. 1 the overall system 200 comprises a central server comprising or having access (direct access or via a network) to a database 204 (or a plurality thereof). The server 202/database 204 comprise identification information associated with printed publications for which augmented reality interactions have been pre-stored.

In the present context and depending on the copyright country/countries in which the server is located, the identification information may include still images of the printed publications or a digest of some sort which represents non-copyrighted data which is representative of the copyrighted data and allows for comparing digests received from portable devices of users for finding a match (or not) with pre-stored digests.

Along with each digest, the database/server may store a set of augmented reality interactions, some of which are specific to a given page/and some others are generic and apply to (or may be used with) a plurality of pages. These interactions can be defined explicitly like the display of an image with a URL access link, or may be defined with a set of rules that will generate context-dependent interactions (for example change in language according to user preferences) or up-to-date interactions (e.g. quotations).

Using a computing device 206 (preferably a portable computing device such as a smart phone, tablet or the like), the user 208 may take a picture/video/live stream 209 of a printed publication 210 using a portable device 212. In the present context and depending on the copyright country/countries in which the user resides/uses the portable device 212, the taking of the picture/video/live stream may include storing a digest of the picture of the page locally or in a temporary folder for sending to the server 202 for identification. The device 212 may then send the digest to the server 202 over a telecommunications network for comparison.

At 214, upon receiving the digest from the device 212 the server 202 may perform a search of the pre-stored digests and upon finding a match, the server may send back to the device 212 augmented reality interactions for display on the display of the device 212.

In an embodiment, the server 202 may be equipped with a series of image identifier mechanisms tailored for the printed matter, which interact with an app on the user's device 212 to allow interaction on the static content of a the printed book or magazine 210 once recognized as an image. Through the use of this dedicated app users can virtually link the analog media, the paper, to the digital world. The fundamental paradigm becomes that the printed text does become the indexing method of choice within the online internet realm.

The server 202 may also include various mechanisms/modules which are in charge of preparing documents, gathering assets and managing usage of assets before and during their needed availability to users. The server 202 may also manage the users account, and may be configured to allow retrieving global or narrowed statistics.

In an embodiment, a dedicated image recognition system may be used to track the user's movement over the page 210. In a non-limiting example, the image recognition system may implement image recognition of a sub part of the image 209 of the page 210 and progressively aggregate all detection outcome to correlate these individual sub part recognitions until the unique best matching page of all plausible subpart is determined. This approach may use a very natural mind set from a user perspective, whereby the system may induce or suggest some movements over the image to obtain the best span over the document and possibly at various distances thereof, to induce a natural feeling that the camera should be placed closer to the page. This also allows for a continuous detection to find multiple sets of equivocal candidates until the system narrows down all the sets as belonging to a unique image of a page.

Referring back to FIG. 1, the database 204 may include the following types of data: user accounts information and counters; assets, description of assets, and actions related to the assets; image descriptor and/or actual images ready for display with assets provided on top of them; text (paragraphs and words) descriptor for each page.

As shown in FIG. 1, the server may contact an available image recognition service 213 for finding a subset of best matches for the image received from the mobile device 212. The server 202 may then perform further refinement for finding the best candidate image of a page from the subset returned by the service 213 as described below.

Server Side

In an embodiment, the server 202 may receive two kinds of data: pages and Meta information. The page may be in the form of an image (image of a page/publication). The image may come for example from a PDF file. The second type of data is a certain number of meta-information kept aside processed then stored in the server. The image and its meta information allow an image recognition software (either in the server or as a service like Vuforia or Aurasma or MetalO) to be used so that image digests received from the user device are detected and delivered the proper index to the server for further processing by the server to the user side.

The processing at the server may be divided into three main steps.

In the first step, the server 202 converts each page to an Image, and stores it.

As discussed above, there are legal constraints related to copyright laws that can prevent the storage of an image on the server while it doesn't prevent the storage of an image descriptor of the image as long as the image descriptors doesn't allow to reconstruct the original image. If image storage on the server is enforced by the user during own user experience that include a picture taken (or a clipboard copy or image Drag & drop, when in computer mode) it is the user's responsibility to comply with copyright laws. However it is expected that user will mostly use this feature for personal use of their own art or landscape or image composition so that the artwork is not expected to require copyrights management. It must also be understood that the system can be configured to function only if the user presents an image version of the page that the user wants to interact with. It is then through acquisition, generally a purchase of the printed version that the user is allowed to interact with the image captured from the publication.

In the second step, the server 202 prepares all the Meta information associated with each image of the page. Some Meta can be in an incomplete form that will be parsed and replaced at processing time. Some others can come from outcome data from third party application initially aimed at different purpose, like making a document compatible for an eReading experience, or like tools for publications of "PDF enriched" for eReading experience (as product made available by Rakuten Aquafadas or Forecomm or others.

The server may also be equipped with filter for eLearning oriented document.

Accordingly, pages having an electronic PDL (page description language) and optionally any additional related files like the original XML of documents in native format or reconstructed hierarchy of the document trough tools such as Aquafada AVE tools, are first read and searched for all the meta information associated with them, that can be explicit or using a process based on information embedded by remote system that participate to the system using a concealed robust embedding system like the one described by patent U.S. Pat. No. 8,762,828 where the information is held by a glyph and is decoded and located in the document to enrich the augmented page with all asset that design may have created and encoded using the process described in co-invented U.S. Pat. No. 8,762,828. The operation described in U.S. Pat. No. 8,762,828 (also called Z-marking) embeds invisible overlaid marks that contain key information that can be assembled and decoded at a later time. This process is especially useful to allow Advertiser and Ad agencies to mark their production embedding Asset designed for specific purpose related to the Ad. According to this patent, documents once distributed to Editors will be merged and flattened in a final Publication in a PDL that will still keep the precious custom information (the marks).

The above assets form part of a gathered assets list from the external world of the server 202. However the Server may also be equipped with a Robot module that analyses the text content itself to gather its own assets. For example the robot may be adapted to analyze the content as well as the formatting of the text to evaluate the order of importance of text fragments like Bolded, headline, quoted text etc. The robot may also be configured to organize a search session with a first immediate search and filtering according to the Editor's request as well as allowing a postponed search session that will run when the document page is recognized.

These Assets may be loaded in the server 202. All Editor mandatory assets may be permanently displayed but a certain number of assets may stay hidden and on hold waiting for activation decision taken by an Operational Research engine which allows to improve artificially the Publication in order to hatch the initial seeding process that should gradually be substituted by user Asset added by skilled and selected user (the User level and skilled rule will be explained later).

During this step the server may run the first robot module to read the PDF or alike and extract text information to create a summary of each paragraph and extract the choice of style like a quote, a bold or a headline. This information may be fed into a public search engine such as Google®, or a private one like some search system intra organization. This robot creates the first level of assets based on the content. Editorial as well as Advertisement. If some image content some Meta information, they will be extracted too and will concur to the global sum of information regarding the page.

Figure 8:
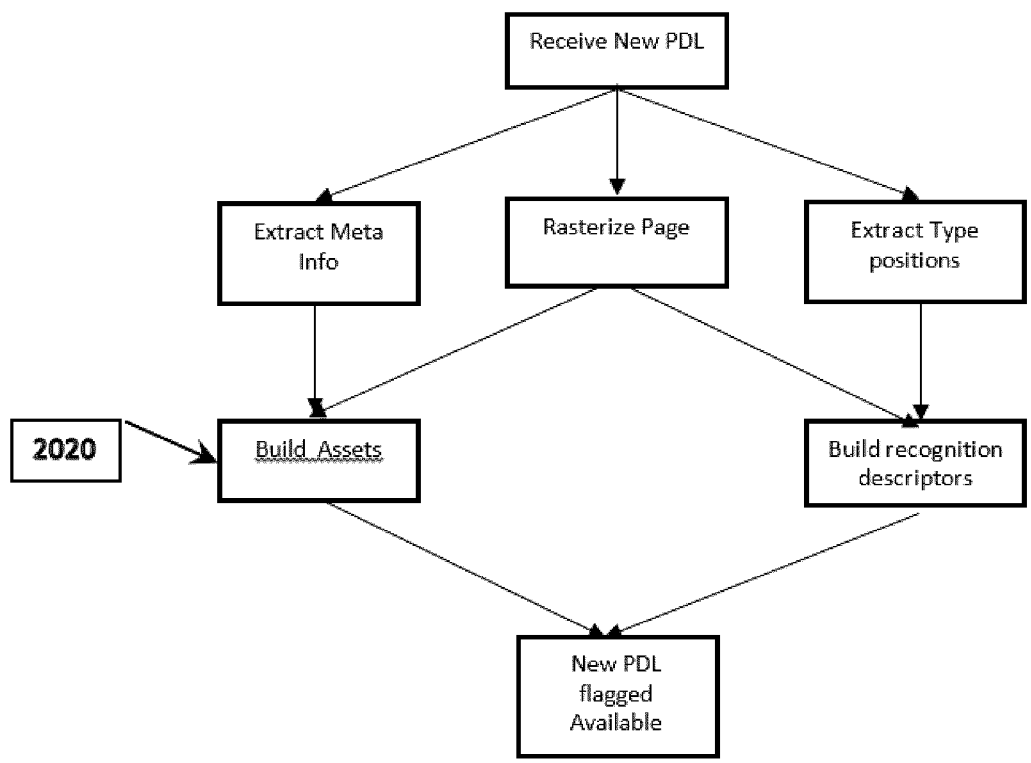
FIG. 8 is a flowchart describing the general function of the first robot module embedded within the server.
Figure 9:
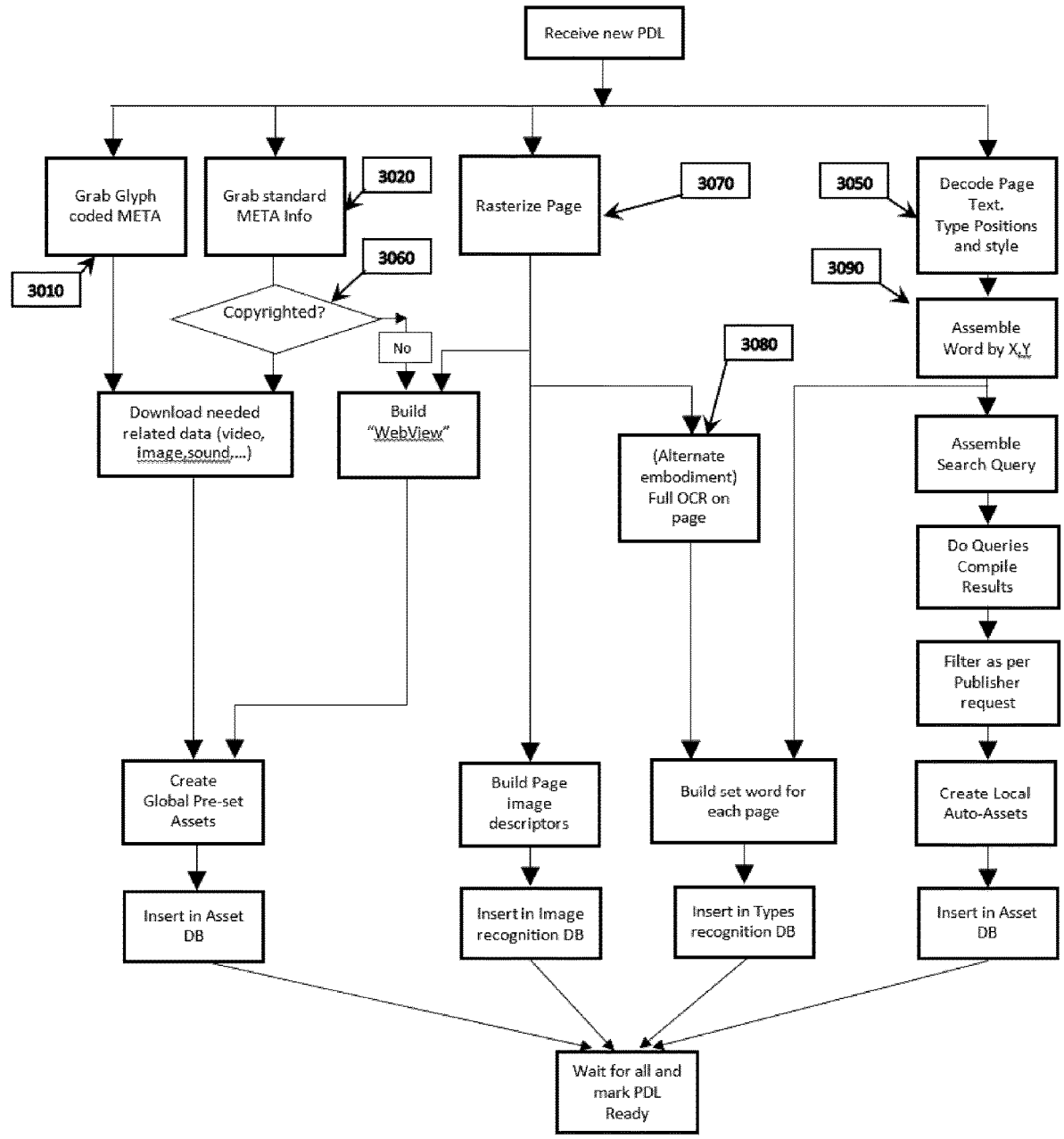
FIG. 9 is a flowchart describing the function of the first robot module in detail.

Additionally the first robot will read the meta information within the PDF either as official meta information or using a process based on information embedded by remote system that participate to the system using a concealed robust embedding system like the one described by U.S. Pat. No. 8,762,828 where the information is held by a glyph and is decoded and located in the document to enrich the augmented page with all asset that design may have created and encoded using the process described in U.S. Pat. No. 8,762, 828. FIG. 8 is a flowchart describing the general function of the first robot module embedded within the server, and FIG. 9 is a flowchart describing the function of the first robot module in detail.

These different types of information collectively create a set of assets that will be made available to the system and properly dispatched to the user when necessary by a second robot hereafter called the rule manager. It should be noted that both the first robot module and the second robot module may be embedded within the server 202 to implement the functions discussed above. Typically the first robot module runs when a new document arrives, while the second robot runs in real time. The functions discussed and shown in FIG. 9 are typically implemented in the first robot, while the second robot 264 implements the functions shown in the flowchart of FIG. 11.

In the third step, the server may call a service that delivers a first analysis of document pertinence based on a user experience intelligence as it can be gathered from connection to the user social network (or instantiate its own image descriptor construction system). This phase gives a boost to Assets of a nature related to main center of interest for users, for example the gender and age of user can be analyzed and Assets of different content but set at the same place can be selected. For example, in a document on a section related to news about a foreign country, Assets like traveling suggestions, fashion information, in-depth analysis of the event, student grade of information or Assets like economical figures, can be displayed based on the assumption that can be taken out of User center of interest.

The term social network must be understood in a wide sense as it can either be a web social network like Facebook® or the as well as a more enterprise oriented network of users if the purpose is more professional such as dealing with a brochure or can be a school hierarchical organization if the media is for example a school book.

In an embodiment, the server may repeat the second and third steps during the life of the publication in order to update the Asset contents and profile the document according to the user request.

The entry material is typically but non-imitatively a PDL (Page Description Language) like Adobe PDF, as a file or set of files describing the Publication. The benefit of using directly a PDL file is in the capabilities it offers to ensure that the image rendering of the PDL absolutely matches the image rendering in pixels of the printed matter which is a mandatory need for Augmented Reality image identification service (otherwise the augmented reality information can be displayed over the wrong page, or the page will be missed as never matching any pre-stored digest). The page or subpart of a page must be rendered as an image from the PDL and used as the reference image (also called "Marker Image" or "Trigger Image" to be recognized. An additional advantage of PDL is that it contains precious information about the text fragments which are needed for aggregating type recognition or glyph recognition, allowing to assemble a final probability of recognition of a page which increases considerably the discrimination of plain text pages as well as decreases the number of false recognition when based only on image method.

The disadvantage of a PDL is in the fact that this is a graphical description of the page aimed at rendering and not aimed at text exchange. Otherwise said text within a page must be accurately placed and displayed but this does not preclude that stream of characters is ordered as it is displayed in the X axis and the Y axis. Otherwise said, the first letter of the page can be at the beginning but the next can be at the end of the PDL file, just preceded by a "move" statement to the proper place for the second character. So that a recognition of words without interpretation of plausible aliases in place is safer than asserting a word reconstruction like an OCR solution would do.

The aspect of words usage is important as the apparatus deals simultaneously with various Publishers, each having numerous pages in their publications. A full OCR based method applied on the submitted image for recognition will have great difficulties reading the low resolution image as it comes out of a camera and will suffers from two related flaws. One related to the difficulty to identify words in a PDL as explained above, and the other and main flaw is due to the end processing of OCR which speculates certain words which decimate an intermediate result based on alternative candidate for types. It acts as a word recognition system with a sorted list by probability of plausible candidates that feeds a classification system which are also connected to the original PDL content for type, including aspect and position. A simple example to show the result of this mechanism is to avoid interpretation of the number 3 in Times Roman with The number 8 in italic Arial. This allows to strengthen the speculation about pages reading of the PDL including position of types. The identification system then does a speculation and a profiling of the document while the user experience is running on it to boost again the identification score by narrowing the document as the sources of image is known for each Publisher.

The major benefit of a word only recognition system is the progressivity that can be applied to progressively discriminate page candidates. This avoids performing a full page recognition which is a length operation with a hefty price in CPU cycle. This is a key issue because user experience should be fast, within the range of one second, while OCR solution could very well require a couple of seconds just to recognize an arbitrary amount of text which are finally not needed just for the sake of page identification.

Regarding enrichment needed for the publication, this can be of various sorts, including but not limited to an image overlay, a 3D animated drawing a URL access on click with or without an icon (then the paragraph itself can be the "click" area) a message, from Publisher or from a social organized group of users, a message from a VIP (as described in U.S. 62/087,598 which is incorporated herein by reference in its entirety), a video or a sound that can be played with a scenario, an hyper-navigation to another pages or publication, a search experience getting data updated at time of user call, a dynamic content like a stock exchange rates or a gauge values of a pieces of equipment or a building if user aimed at a user manual a map or a blueprint of a floor, or icons giving access to games or other application, etc. . . . .

All these enrichments are generally referred to as "Assets" in the terminology of Augmented Reality (AR) realm. Assets apply on images that support the Asset at generic or specific location, theses reference images are called "Image Marker" or "Marker" or "Trigger Image" in the AR terminology.

These Assets will be displayed at rendering time of the page. This happens on user display once a positive recognition happens on a page. The economic goal of the apparatus mandates many automated methods to gather and generate these Assets without human intervention. Accordingly, assets can be placed by humans or automated Robot modules at various stages of the production and edition process.

User Side

As discussed above, the user may install a dedicated app on the device 212 as exemplified in FIG. 1. When launching the application, a protocol may be initiated with the server 202 to retrieve credentials and update in app information. It is also at this stage that a successful connection is needed to send back to the server any offline experience (fetch of Image caught by user, update of augmentations, update of user profile, network, preferences, etc. . . . ). Identification of the user (at least through user's phone number) is an important step because a set of counters and information for the account is maintained on the server side for each user.

Figure 2:
FIG. 2 illustrates the global ranking screen which displays user account counters and the list of publications related to user interest.
Figure 3:
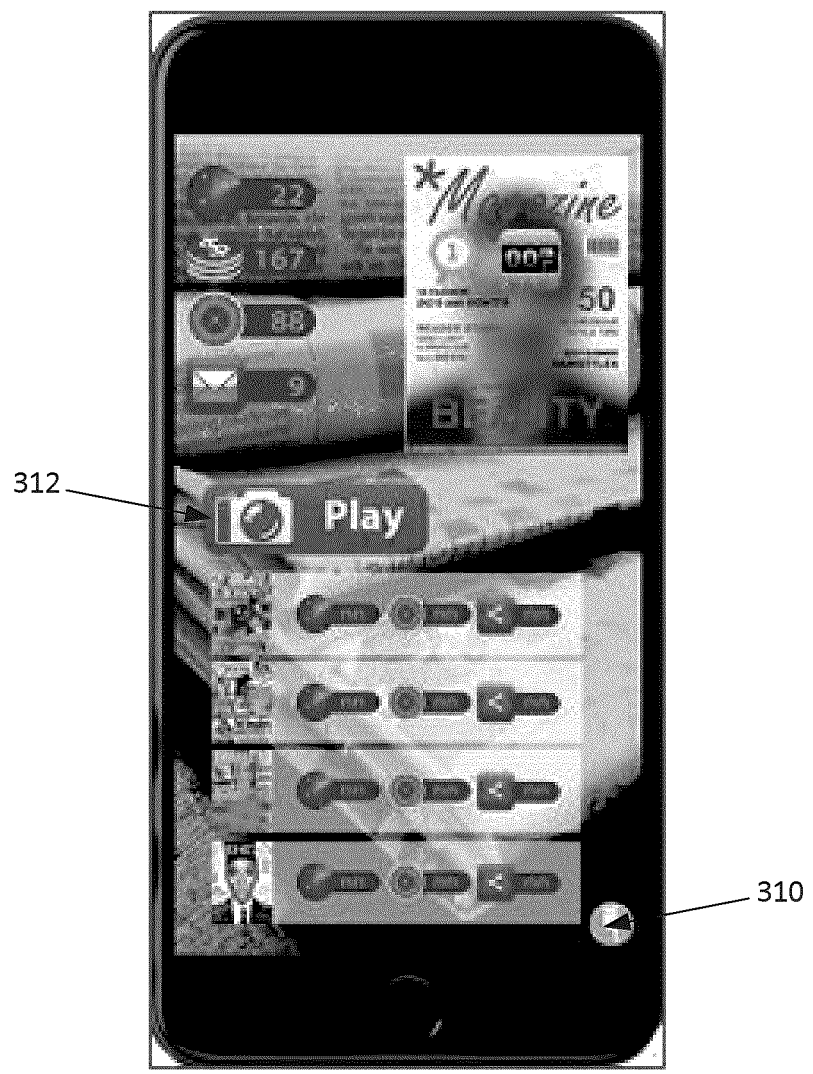
FIG. 3 is the main screen ("home" screen) and displays user account counters and the list of publications related to user interest.
Figure 4:
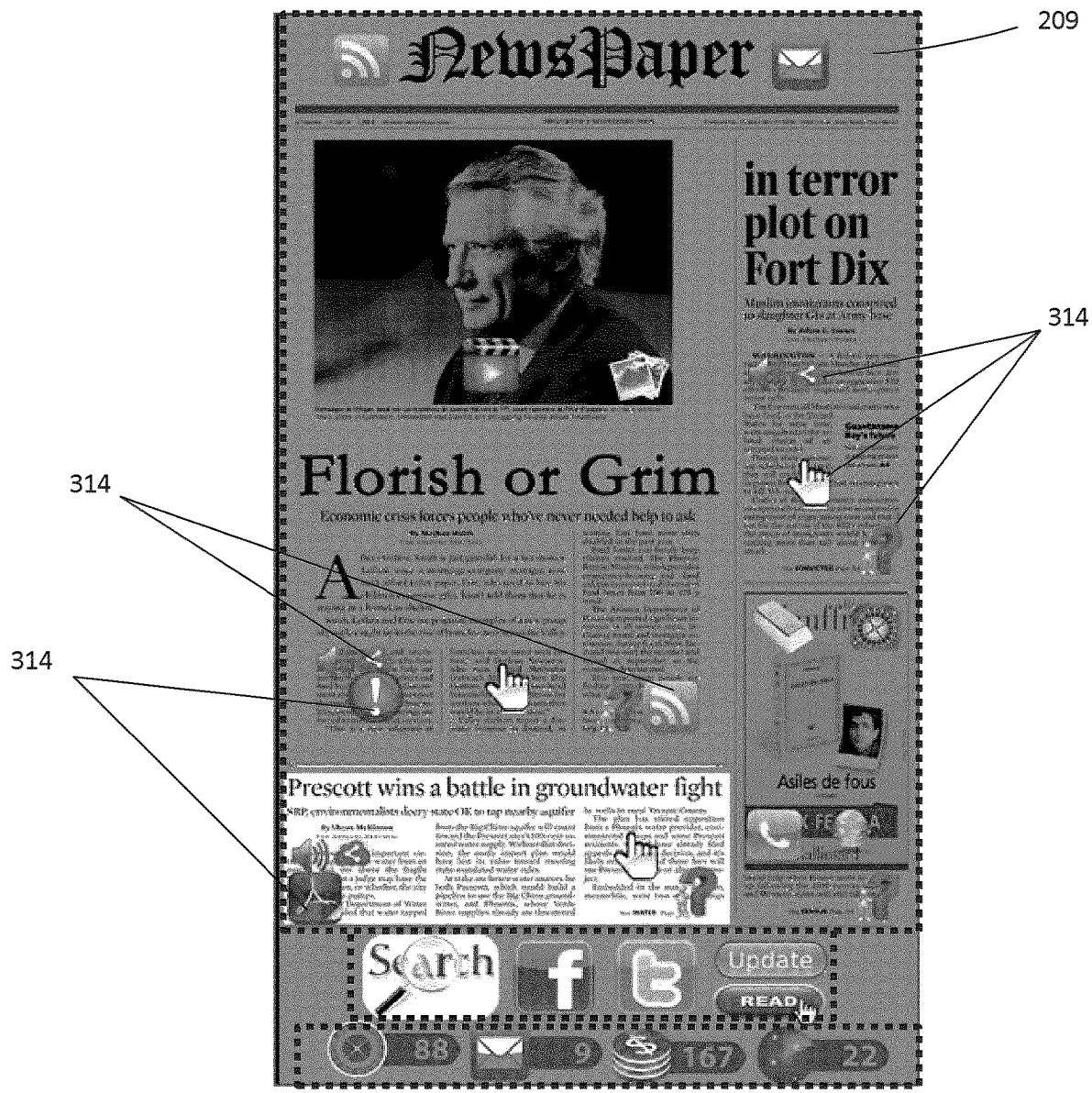
FIG. 4 shows an example of assets provided over a publication page in accordance with an embodiment.

In a non-limiting example of implementation, the user interface may include a series of "screens" which can be selected by a horizontal sweep gesture. An example of these screens is shown in FIGS. 2 & 3. Additional screens may be made available depending upon the Publisher's decision. An example of an additional screen is shown in FIG. 4.

In the present example, FIG. 2 illustrates the global ranking screen which displays user account counters (explained later) and the list of publications related to user interest, publications that are top ranking at least in one of three categories:

most available assets,
most active in social networks, and
most available bonus (paid by a sponsor like an advertiser).

This list may be vertically scrollable.

FIG. 3 is the main screen ("home" screen) and displays user account counters (explained later) and the list of publications related to user interest, publications that are top ranking at least in one of three categories;

most available asset,
most active in social network, and
most available bonus (paid by a sponsor like an advertiser).

The area 310 at bottom of FIG. 3 allows to access the global publication ranking screen of FIG. 2.

When the user presses the "Play" button 312, an AR identification and tracking mechanism is launched to identify the Publication page. Once identified on the server 202, the server 202 produces the proper set of Assets 314 to display to the user on the display of device 212. This set of Assets 314 (shown in FIG. 4) that will be displayed atop the image 209 is referred to as Augmentation, and the page 209 itself is called an augmented page.

In an embodiment, two modes of display exist. The main publication view (502) exists in two modes of interaction related to the image display.

When on printed media, the device 212 displays the camera feed in real time. This lasts until the trigger image is recognized by the AR service. The following steps are then performed: Extract Image digest; Send it to server (202);

Call a service on the server (202) to find if image exists; Gather every enrichment as Assets for the image found; Display them using an AR video experience.

In the first mode, an image tracking mechanism is activated on the device 212 so that the assets 314 can move while the device 212 moves on the video sub-window (called ARView mode). In the second embodiment, the assets are displayed over a fixed view of the images (WebView mode). This fixed view may either come from the server when the server has a thumbnail version of the page of the publication, or may be taken from a freeze of the video picture with the help of a processing module adapted for sorting the best focus, best orientation, best contrast within the set of frames continuously captured within the time necessary for the server to answer even if a first frame had been processed and sent.

By contrast, when the app is called as a reader of a PDL like a PDF; then action on the play button 312 will cause the following: Extract Type glyph, characters and associated position; Send it to server (202); Call a service on the server (202) to find if any PDL document exists with the same content; Gather every enrichment as Assets; and Display them exactly as if they were taken out of an AR video experience.

In an embodiment, the Augmentation robot/module on the server 202 embarks after a successful AR recognition (in the SmartPhone case). However, when the page under scrutiny is a digital page (web page), the augmentation modules creates the augmented page establishing the proper list of assets suited for the user on this Page. During this process the Augmentation Robot also considers the Editor moderation and the existing level to decide whether or not auto augmentation will occur.

In the second embodiment, the apparatus allows to export the Assets as a layer over an existing Digital version of the document. So that the same experience can be played by a user but on a digital document typically in PDL form, to respect the paradigm of a user experience this is done using a standard display renderer for the PDL part of the page, and overlay the rendered image with a layer that contains all Asset. This layer receives user inputs using mouse or touch pointers or other user inputs allowing to capture user inputs and trigger proper interactions exactly as the smartphone AR experience will do.

This renderer and its layer for asset system, for the second embodiment of the apparatus on the end user side may then take the form of a Javascript application with exactly same rules and UI system, but also embedding agent that are triggered by meta-information embedded in the PDL part of the document. As there is no need for image processing and correlated CPU consumption the end user side can be a HTML5/Javascript application aimed at running within a browser environment. This cross-platform approach can be replaced by a dedicated app when performance of an interpreted language like JavaScript is an issue.

The apparatus bypasses the AR recognition system and directly asserts the page accessed and even the viewport to understand the area of interest facing user during display of the page.

Once the page displayed to the user or captured by the user's camera is identified the asset set will dynamically be fetched and sent to the renderer.

It must be noted that most if not all of actions that occur on the server can be done using the local apps if the PDL document is equipped with proper Meta information. U.S. Pat. No. 8,762,828 describes a method that allows a full off line integration. The user account can be managed locally, the document may come from an unknown digital source as a PDL and still be manageable by the apparatus. User accounts may need an online access for Social exchange and reload.

The embodiments involve a motivational system providing an accounting balance weighting the wish for a user to participate to make bet which allows the user to make additional scans if the bet is successful and which penalizes the user by losing credit when no assets no assets are discovered.

Generally, the goal of the user is to earn points for experiences, acquire privileges, and communicate with the best tools/weapons. Advanced goals involve becoming the most famous "tagger", virtual Tagger, or the game's social famous actor.

User Categories/Levels

Users may be registered or unregistered.

Unregistered users may fill form upon starting the game, or may login using the credentials of a social network to allow immediate access to a follow list to then obtain more rewards and "ScanPlay" counts.

Registered users however, may start immediately with a camera viewer and a list of counters at the bottom and a list of titles of followed journals as exemplified in FIG. 2. The Fundamental purpose of the play for beginners or occasional users is to access information shared by the editor or by contributors. The goal for game minded users should more be geared toward maximizing the Virtual money as explained below. In order to do so, users need to use "ScanPlay" (a right to Scan a page) which is something that must be earned and is the rare part of the win.

In a non-limiting example, the system may offer four advancement levels of users: press follower, VIP follower, SnapContributor and VIP.

In the press follower category, the user may register themselves to a series of media that became "followed" by the user. The registration process can be done during user experience for example when "ScanPlay" is called on the first page of a magazine not yet "followed". However the list may also be taken from a social network such as, but not limited to, Facebook, Twitter, LinkedIn, etc. . . . where the user usually has a list of followers already established. If the social network system used by user has an API that allows to update the "follow" list, any new incremental addition can be sent back to the Social network.

The concept may be applied to objects other than publications (such as a brand of corn flakes or a drug information sheet etc.).

Once followed a Media allows to: Collect scans (or buy) to allow users to experience digital original and exclusive offers; Discover hidden and exclusive content; Share "good plans" bonuses in the friend/connections network; Win bonuses, participate in virtual lottery, win coupon codes and coupons for purchases; and see contributions from friends if done by a "SnapContributors".

VIPs are special individuals with granted right to add contributions about themselves over publically published images as opposed to the publication of contribution limited to a network of friends. In addition to the options offered by press followers, the category VIP Follower allows to: discover the personal contributions of VIPs (a social virtual wall that binds People to their fans); and Share and like the contributions of other people.

The category Snapcontributor allows to discover the personal contributions of its social network on the press, a place of expression and sharing news and diffuse at very large scale; share its "discoveries" and its publications through scoring view, share and like; obtain a ranking of the best contributors; start the competition between friends. Tag press your footprint and collect your followers.

The category VIP is a level to reach but rather a category of power that the user t requires an authentication process to reach and a registration and moderation from the apparatus managing organization or an authorized deputy. This level allow to answer allegations provided in publications when and where the VIP is directly cited, as described in co-owned and co-invented U.S. 62/087,598 which is incorporated herein by reference in its entirety.

Fundamental of Relation User to Publisher

The purpose of the present embodiment is to justify a paying party to fund for the editorial enrichment cost. The principle involves the concept of "follower" as already defined in known social networks such as Facebook/Linkedin/Twitter/Youtube.

In these social network systems, companies aimed at maximizing their relationships with a specific audience and want to narrowcast information establish themselves as users to be followed by their friends/connections.

The embodiments apply the same principle in a novel manner in order to fund the assets viewed by the user and control the amount of free access by users to balance the amount of money or virtual money collected by sponsors (followers).

In an embodiment, the system includes two types of Publishers: participating and non-participating.

The participating one will be charged by the player authority each time a user recognizes successfully a page belonging to the publisher. Ad agencies or brands can be assimilated as potential publishers if they want their ads or their product to be leveraged by the system. Hereafter theses participating companies are referred to as "sponsors". These sponsors must be equipped with a social network page like Facebook. However the apparatus also offer a social network capability and the company can directly register with payer authorities. When a user registers using their social network credentials their set of followed companies are scanned and sponsors are identified and added as active parts of the user counter system.

The non-participating publishers are those that have no contract with the player authority. Their content can be managed but no gifts are given back to users and the managing of their associated counters is solely on a cost basis for the user.

In an embodiment, the system may include a series of counters system for each user. FIG. 5a illustrates an example of the counters system in a vertical mode, and FIG. 5b illustrates an example of the counters system in a horizontal mode.

As shown in FIGS. 5a & 5b, the counters include the following:
ScanPlay (MPSP)
Virtual Money Currency
Bonus Points
Fame score "ScanPlay" 601 is a general purpose counter, which decrements upon usage. Users can buy ScanPlay or receive it from friends, or exchange it from gain in VMC.

The counter MultiPurposeScanPlay 601 self-increments following certain rules e.g. self-increments by 3 every 24 hours delay, as a gift from the managing organization in order to maximize audience and keep users coming.

In order to give the users an incentive to "follow" a brand, the apparatus may have an exchange system from sponsors counter to scanplay counters 601 when a scan is done successfully on a scanned publication. Accordingly, when a gift is given by a sponsor company and is triggered by a page, this gift in turn is transferred back under certain condition to the main "MultiPurposeScanPlay" (MPSP) 601 counter. This action is the main principle of the money dynamics.

It must be understood that in order to maximize scanning of the Publication, sponsors must make their best effort to offer reason for the user to scan a publication page. This can be associated with editorial as well as advertisement. The capacity for sponsors to themselves decide what asset they want on their publication allows them to also directly maximize their gain for example by organizing a purchase act with assets as simple as a URL going to a web site for shopping. Geolocation capabilities may also be provided, and may be used to establish a relationship between a printed publication and a product through traditional web paradigm but using physical paper as the index in the user purchase experience.

Referring back to FIG. 5a&5b, the "ScanPlay" 601 counter represents the "MultiPurposeScanPlay" (MPSP) capabilities. This counter merits some explanation as it encompasses usage of two kinds of counters. The ScanPlay counter which may be earned as part of managing organization gifts, bonuses earned, users' exchange, or users purchases as will be further explained below. A positive ScanPlay allows to scan any publication, sponsored or not, and encompasses also the ScanPlay counters respective to each specific publication sponsored by their respective publisher (or a related third party) hereafter called "SpecificPurposeScanPlay" (SPSP). These "SpecificPurposeScanPlay" (SPSP) counts have as attribute the publication that gives it to users and in counterpart only allows the scanning of the associated publication (when they are positive) for successful scan of the publication. The arbitration between MPSP and "SpecificPurposeScanPlay" (SPSP) favors decrease of SPSP. If SPS is 0 then as a last recourse MPSP is decremented. However the rules about MSPS impose that it needs to be mandatorily positive in order for any action to happen even if user have available SPSP. Otherwise, the user is stalled and must wait or buy or find friends that will give count. This counter will involve the Sponsors counter using the following logic. The "MultiPurposeScanPlay" (MPSP) counter is decremented each time a positive answer comes from the image identification system, when the user calls for identification of an image (it is a loss for user then). In case of unknown image then the score stay decremented. It is a permanent loss and user maybe unhappy about this and will refrain to use the publication in the future, which creates an incentive for the publication to become a sponsor (otherwise users will avoid scanning it).

If the page is part of a followed publication (e.g. has a sponsor) and the followed publication has a positive counter then the sponsor counter "SpecificPurposeScanPlay" (SPSP) is decremented (a loss but for the sponsor) and simultaneously the "MultiPurposeScanPlay" (MPSP) counter is re-incremented. In other words, users can only scan if at least the MPSP counter is positive and will incur a loss if no associated Publication followed counter can be decremented.

The purpose of this penalty is to make the user take a gambling risk when looking at a page. When this counter reaches zero, the user can either buy "MultiPurposeScanPlay" (MPSP) ScanPlay using cash or can wait a certain time before seeing an increment (as discussed above) and optionally also can wait for SPSP count to be incremented as part of the rules the publication apply to give as gift count for their publication.

In a non-limiting example of application, the MPSP can be either purchased or can be earned. Scan action can be of 3 kind; Bought, Earned, Exchanged. Bought "MPSP" (pre-paid card or inapp purchased) are across publication (Can be used for any "Scan" play). Earned "MPSP" trough bonus system or trough automatic gain after a 24H delay are specific to each followed publications.

Exchanged, or given, "MPSP" are received trough contacts and social network, "MPSP" does keep their attribute as; "Across Publication" (MSPSP) or "specific to a publication" (SPSP). It is then of interest for users to exchange first "SPSP" "specific to a publication", this is an especially social interaction as it improves interests for cases where users are "friends" but have different followed publications. The system allowed external messages system to be used giving a capability to the user to exchange ScanPlay counters (MSP) or (SPSP) using tools outside of the game (like email or SMS). Then the ScanPlay may be exchanged using a user key and a ledger book with confirmation system to sender.

"Virtual Money Currency" (VMC) counter 602. The VMC counter 602 and associated earned bonuses 603 are aimed at users with a gamer mind. Bonuses 603 are made to leverage earning capabilities while playing to earn virtual money or "MPSP". This in turn allows to buy "MPSP" or right to setup personal Asset.

Also this virtual money 602 allows to access some assets that can be of a nature requiring to pay to access them. The Virtual Money 602 can be fed and increased trough a pay system with real money. Virtual Money 602 can be shared amongst users provided it is a lawful operation and user have allowed this features for security reasons.

"Fame" score 604 represents the user fame rank. This counter is of interest for competition within their social network and is based on:

"Experience" counter; and

Popularity.

In an embodiment, the fame score of a user is time sensitive in the sense that the score decreases with time if the user ceases or reduces the rate of their activity such that the fame score will be set to a certain average when a predetermined time period elapses. This may encourage users to keep using the app and interacting and may also give the chance for new users to reach high scores and compete with users that started interacting earlier while always being fair to the early users by gradually decreasing their fame score if the activity ceases or reduces.

Experience counter also manages access to some specific level and privilege, accounting point earned during the use of the game. For example each Play that change the Scan-Play counters may give 1 point, Sharing an asset or page give 2 points, setting a personal Asset give 3 points, having a personal asset being triggered (clicked) give 5 points (this emphases the popularity of an asset).

This drives the expertise profile ranking, which range from "beginners" to "snap contributors". These profiles change their ability to interact with the publication and some action is not allowed unless you reach the proper profile (proper level) The level is based on an equation based on 3 main parameters explained below. But while the system allow skilled user to never pay for their use, users can purchase "MPSP" which allow them to artificially raise their profile level.

The highest level is snap contributors which allow to have in depth capabilities to interact with the publication. However the Editor may keep a moderation capabilities and can censor contents that are inappropriate for any reasons.

Because the available real estate on a single page is limited there is reason to avoid accumulation of on page assets (aside of any Blog kind of history of asset) so that a non-limiting example of Fame privilege is to allow a higher ranked user who has the right to replace an asset setup by a lower ranked user, or may see the life duration of asset of limited duration being increased, also the kind of asset are more rich (Video, animation), or even allow a specific ring of player to setup rigged asset that would decreased "MPSP". This acts as a moderation system as well as a rewards.

The "Popularity" score is based on the contribution made by a user to a publication when they are at a level that allows them to raise their profile to contributors, hereafter also called a snap contributors. Each contribution has a "like" model that allow other to rate them. Sum of others user "like" of the contributions is accounted and will generate a profit to user in form of the «ScanPlay» game concept (right to scan).

"Follower" Counter.

When user interacts with the system by either adding their own asset or even their own Page (own original image of any legal kind) then their edition will be linked to a "follower" and "like" mechanism. As a mandatory accessory to this the application a certain number of social networking system are implemented with associated counter. This allows to share messages between players which is a method to qualify a group allowing narrow casting of personal asset as well as being a communication system that are expected to allow exchange of info to best play.

Bonus Dynamics

In an embodiment, and as shown in FIG. 6, a screen putting emphases on some gambling minded asset may be illustrated on the device 212.

FIG. 6 shows an example of a sponsor oriented screen. This screen appears once a page that has been recognized. This view allows the user to collect Scans and Bonuses. A non-limitative example of assets are Ads that allow counter increment directly to "MPSP" counters such as the assets 2010 and 2011 shown in FIG. 6. Decision to increment user SPSP or MPSP are sponsors decision involving their own marketing strategy, bearing in mind that users can be made aware that bonus are MPSP which is of higher interest than SPSP.

When a user clicks on the lottery shaped asset 2010, the device 212 may be logged and an incremental ID number is given. On the server an ID number is randomized and deposited with a bailiff. If the ID matches the user is the lucky winner of this draw, which is virtually equivalent to the "scratch on ticket". The interest is in the fact that there is no obligation of purchase to participate and multiple sets of winning lots which may or may not be geo-located. This kind of assets is compatible with operations related to magazines or alike and can be extended to packaging. A navigation scenario involving a sequence of clicks before delivering the lot allows more sponsors to be involved.

By contrast, the asset 2011 is a direct earning of Virtual Money Currency that can happen following a single click. When a profit of that kind is earned, the incremented counters only involve the publication that bear it.

The Asset 2010 may have an associated rewards and can be either an immediate win (like the 'Nth the player as defined by its IMEI win a bonus), a tease for a Bet, an access to a more sophisticated and side game system.

Bonuses are sponsored by the Editor and Advertiser, however the sponsor can be unrelated to the publication. Won Bonus generate Virtual Cash that in turn can be used to either buy "MPSP" or other more tangible object. Bonus assets may be of two kinds. Some are from a sponsors with a fixed value by won draw and some others are splinted as being part of a pool of Bonus of "Virtual Money Currency" (VMC) that must be spread harmoniously.

However bonus that come out of a pool of bonus VMC is generally based upon the popularity of some publication, but such popularity can grow in an unreasonable manner (over a ratio of 1/100000 versus the average of other publication), this boost of popularity is used as a ratio to increase the value of Bonified assets, this in turn may create a strong unbalance in the system where all the VMC of the pool, where all the VMC will be used for only a few or even one assets.

It is then of interest to have a regulation robot that will guide a dispersion of the pool of VMC based on popularity but without being subject to an avalanche effect of popularity. The robot module may be a separate apparatus and may also be embedded into the server 202.

In an embodiment, the robot may use a Rheology concept where the thick fluid is made of the granular popularity of one asset that belongs to one sub image that belongs to a page that belongs to a publication that belongs to a publisher. The Assets Popularity (AP) must be seen as a thick fluid that will spread on the surface underneath with a final minimized function of potential energy is W=AP×Gain. Then the rheology of the thick fluid will disperse the Popularity to neighbor Assets. An Assets is considered as neighbor if it belongs to a same publication, but based on the subject of the page then on page number (for example a Page set of culinary recipes part of a home improvement magazine) then the neighboring publication will be considered based on the relationship in the "followed publications" using averaging of user information as they all have a list of followed publications.

Accordingly, the robot is adapted to disperse the VMC associated with the surge of popularity of a given publication to other publications that will benefit from a surge on the given publication. The Publisher may have a certain degree of control over this dispersion to push up or down the dispersion at certain stress points but may not be free to completely level up or down the stress point. The more VMC there is at a place the more difficult it will be to add (pushing up a peak). The equilibrium of the surface is managed by simple rheological like equation. The control user interface given to Publishers may be adapted to show the VMC and allow the publisher to level up or down a given stress point (master publication) chosen by the publisher. It is not the interest of the system to see publisher managing at "high speed" their publication. So that a change in "height" equivalence of a stress point will also need a certain time to spread out based on VMC fluid thickness.

In other words, time is a factor that allows to level up all publications to be equal in level assuming that user activities stop at a certain point. This means that the VMC available at each bonified Asset will be the same after a certain time if no action is happening. However the game dynamics will keep the popularity information for the user and the user will just see the gain to be the same across all asset in a given asset set. Then if the game restarts the tendencies for user will be to go after the most popular one where the gain will grow in time faster.

Artificial Intelligence for Asset Management

While each user has access to their scores, internally each user is driving a wider range of counters and scores that will be used to compute the impact the popularity of the user or the publication. The equation that are underneath are simple by essence because they must be in a form reasonably easy to understand by the users. Many subtle interrelation may exist between scores, user profile (expertise and popularity) and effectiveness of the AR experience.

However, internally to the system, the existence of Assets is very dynamic as they can be created using robots (Auto Assets), or added also through robots or by direct interaction from the editor, or disabled. Accordingly, a process exists which can hide it either directly from an action from the editor or because the server central system feed an Operational Research (OR) engine that will manage the asset as resources with the goal to minimize the number of assets on a publication still maximizing the number of interaction from user through Assets.

This OR engine starts with a pre-established set of Assets from advertiser and a minimal asset set for the editorial part. Pages with low activity will see a boost in robot-created Assets while page of high activity will see disabling many robot-created asset if seen with a low use score, in favor of user defined Assets. The principle being based on a "surface coverage equivalence", itself based on the popularity of surrounding assets (time×uses) so that a popular area allow more asset to be put but while also decay with time allowing to restore surrounding assets.

At reasonable intervals (A permanent process that will restart periodically e.g. every 10 min) the OR engine may reactivate Auto Assets to see if there is some interest in it. This allows to establish the law of usage of each asset which in turn will stabilize the life of the asset based on regularity. The variance of the Asset appearance disappearance being best when closer to zero. The richness of a publication being a number that will characterize the number of Assets that a Publisher would like to see being part of the publication. The choice for the publisher being to either have many Assets but probably of a small individual interest or a fewer amount but of higher individual interest. This tuning is available at Document level as well as at page level and topics level.

In a loosely coupled mode the OR engine may be able to trigger an AI engine. A non-limiting example of an AI engine may include the adapted engine proposed by the company "Spirops" which is tailored for the gaming industry. Embodiments of the invention adapt the existing AI library to allow for interacting with pages using the score of other users and the score of assets to simulate a consistent non-playing user. The AI reference set being dependent on the publication and the document. It will manage non-player character (NPCs) that will act like ghost user and will be in position to regulate the game and avoid an avalanche effect of the "Experience" counters and predominance of a major player. All counters and scores are allowed and can interact. However the AI part is forbidden to impact the cash paid part of other users and will never be cited within the Fame list.

The publisher need to be insulated from the robot that would artificially increase the "follow like" counter. Popularity counter need to be protected against poisonous injection of popularity and hacking robot based automatic player a certain number of rules is established. For example:

Once a user has successfully recognized a Page, the next "MPSP" over the same page still involves the counter logic in the same manner. The sponsors may decide to avoid decrementing their counter, in this case the MSPS counter will stay decremented which is a user loss.

"MPSP" has a "no play" delay that will be increased with the pace of usage of "MPSP" from positive recognition and decrease according to a function with a second order coefficient (like a square of rate) based on this pace. The purpose is to allow a minimum of 10 seconds between "MPSP" unless it is an adjacent page, or if the Play scenario allow it, according to the agreement with the publisher which is the paying party involved when a user plays an asset of a bonus kind the user will no longer be able to play it before a certain time (one day) and or before a certain number of other users play it (successfully or not). The OR Engine will feed a behavioral pattern detector using IP address/IMEI.MAC address, play pattern (frequency, hours, method, sequence of jump from asset to asset) to detect potential robot. It may then use a robot deterrent strategy like but non-limitatively a "Chapca" a "delay" a request to relog, etc. . . . . .

Image Identification

In an embodiment, the picture of the publication as taken using user camera during ScanPlay is sent to a central server. It will first be checked for aspect and quality, preferably on the client side (in the SmartPhone, tablet or laptop) before being sent to the server. A digest of the image is computed on the client side preferably and this digest will be searched amongst all pre-stored digests of all pages already received and stored on the image recognition server. This happens using the service of module (213) which is either an external services or a side service using the image recognition method describe further below.

First level of analysis will check for image quality. Such verification can be done using an histogram of frequency analysis. The absence of any high frequencies is a sign of some strange focus. Second level of analysis deals with two kinds of image transformation that can hamper the process. Examples of processing and repair include:

1. Barrel Distortion

When the image pickup is done on a page of a magazine or book other than the cover page, it is logical to assume that the magazine was open, and that the photographed page of the magazine was not flat enough during image pickup. In other words, the page being photographed includes a curvature on the surface due to the gutter. This type of distorting can be assimilated as a barrel distortion and may include perspective distortion.

In this case an analysis of the content may be done to allow for more explicit determination of the barrel distortion. In an embodiment, a Hough transform may be used for dealing with lines for determining the degree of distortion and even determine loci for correction. It can be understood that the Hough space will exhibit an accumulation of points on the zone made by the start of the barrel distortion close to the gutter. The statistical dispersion of accumulation node reveals a modified sinusoidal aspect characteristic of an open book.

Once the degree of distortion is determined, an image warping method may be used for correcting the distortion.

In an embodiment, correction of the barrel distortion is performed before performing the frequencies dispersion analysis.

2. Over Exposed Distortion

This type of distortion is related to use of flash or bright light while taking the picture of the page at a short distance especially when the page is printed on a glossy support like a glossy paper. In this case, areas of the page that are closest to the camera are considered as being "over exposed". In an embodiment, the server 108 may perform a frequency conversion in the frequency space (domain) followed by an analysis of mean frequency taken out of the frequency histogram.

Such overexposed area can also be diagnosed by the aspect of the edge that shows same frequencies but with a lower saturation for the HSV value of an area of a small size. Accordingly, an elliptical like gradient of saturation that simultaneously exhibits constancy in frequency distribution at least on some inner regular path of the ellipsoid can be used as a clue that such over exposed area exists. In an embodiment, the server may use the HSV histogram to obtain an estimate of the damage to apply the appropriate correction accordingly. Otherwise, if it fails to find enough information in the depth of the center part of the ellipsoid of overexposure the apparatus can ask the user to take another picture, warning user of the need to handle glossy specular effect and spurious lighting.

It must be noted that the corrections needed are not aimed at delivering a picture having a decent display for viewing by the user but only to provide the image processing with sufficient normalized geometrical aspect as well as color aspect that would allow decent gradient and frequencies pre-processing.

Otherwise, the server may return a notification to the app asking for a new picture.

Picture Already in Digital Format

In the case where the page containing the offending image and/or text (combined will be referred to as picture of the page) are just posted on a website or in a social media page or campaign, then a picture thereof may be directly taken in digital format e.g. on Windows® systems a picture of the screen may be taken by pressing ALT & PRINTSCREEN simultaneously, and on iPhones® pictures of the screen may be taken by pressing the shut down and menu buttons simultaneously etc.

Whether the picture is a snapshot of a magazine or taken immediately in a digital format from a website or social media app e.g. Facebook® app, the app may first rasterize the picture of the page in full or in part for further processing. Once the image is acquired and rasterized, the app may perform a frequency analysis on the image using for example a histogram of frequencies. The main aim of such step is the detection of high frequencies, the absence of which is a sign of some strange focus. The picture when processed by the app will be transformed into a signature, otherwise said, a digest is generated for the picture and this reference will be sent to the server to be stored, thus avoiding storage of copyrighted materials on the server. Alternatively non-copyrighted images can be sent in full to the server and be used later substituting the video version by a still version the "WebView" aimed to be of a higher quality than the image used for recognition and captured during scan action by the user.

Image Recognition

Once the above processing is done, the picture will be ready to be compared.

The server may include ready to use identification systems such as but not limited to Qualcomm Vuforia. These services suffer from few flaws, the most important one being that they return a subset of image candidates and apply a set of rules for finding the best candidate. However these rules often result in selecting a best candidate which is not the real match, while the subset of image has higher probability of containing the real match. This is especially true when dealing with page of text that may more easily have optical similarity.

Post Image Discrimination

The embodiments propose several methods that can be used to refine the results and select the best candidate from the subset of images returned by the existing image recognition service. Examples of such methods include: image comparison, word based recognition system including modified OCR methods, and paragraph-based pattern recognition systems. Each of which being described in greater detail herein below.

It is to be noted that the embodiments may apply the above methods either in parallel or sequentially. For example, a refining method can be started while the Qualcomm Vuforia service (algorithm) is searching for the subset of image candidates. In the present case, the refining method can analyze the potential matches output by the Qualcomm Vuforia service as these potential matches are being identified by the service, Said otherwise, the refining method does not need the entire subset of images to be identified by the service in order to start. It can simply analyze the individual potential matches one by one as soon as they output by the service, in order to save processing time and make the experience more enjoyable and give it a real feel.

Similarity Analysis

This additional recognition method is aimed at allowing a post analysis of similarity and either allow other additional algorithm to do a discrimination and/or leave a choice to user to decide and warn them about what they could be facing.

A simple example of post recognition action that occurs when similarity is diagnosed back from recognition is the capabilities to establish a document based reason for a choice of pages. If a user scanned the front page of a magazine, the probability that the next scan belongs to this magazine is extremely high. So that a return with a certain number of candidates out of recognition can raise indetermination that can easily be resolved assuming user continuity of action.

The extreme case is with a full page advertisement which is used in many publications.

Additionally, once this step is done, the image is submitted to the recognition cloud database for manufacturing of the image descriptor and indexing in the bucket of image descriptor. Some recognition services deliver back for each image a rating that establishes the recognition capabilities of the image. When a new image is inserted in the system, the similarity will influence rating of images, then a scan of all image rating allows to find the few that have a decrease in rating which give a clue about the similarity relationship and risk at recognition time.

This value as well as the network of images involved is stored on the server also for later use at recognition time.

In events where the existing image recognition system returns a wrong candidate, it is possible to identify the best match by consulting in a table of similarities in the database. In other words, during the registration phase each image is compared to all the others and a coefficient of similarity is created which determines the degree of similarity between a given image and similar ones. Therefore, when the existing image recognition system returns a single match, the system has to determine whether this single match is the right one or not. This may be done by consulting the table of similar candidates in the database. In which case the subset of candidate images on which the above refinement methods are applied will be the ones extracted from the table which are the images that have a coefficient of similarity beyond a certain threshold.

Recognition services (213) can be provided from various suppliers some of them being unable to deliver a list of candidates sorted by similarity. Vuforia service being an example that suffers from this inconvenience. In an embodiment, the system used to overcome the lack of information about coefficient of similarity to other reference images from recognition services (213) works as follows: it submits the reference Image to the recognition services. In the ideal situation, the recognition service will inform that no image match the submitted one, this means that reference is sufficiently unique in itself. However, if the recognition service finds a sufficiently similar image, the service will return an index for this image. This allows to pull out the original reference image in full pixel of the page, and analyze the difference between the submitted reference and the suspected candidate using the algorithm used within the service (213) then an image comparison tools is applied first doing a Hough transform on both images, then uses a pattern matching by zone to anchor one image onto the other, then making a comparison of image with a system like an image subtraction, then applying a kernel to eliminate single pixels and noise, then runs a growth kernel to aggregate points of differences to interpolate narrow to each other (find a cloud of point) then runs a thinning kernel to eliminate again single pixels to extract the location of the amplified difference. A counting of such pixels delivers an estimate of similarity. This will be used later at detection time to sort out an order list of image to propose, by creating in the DB (204) for each reference image a list of images found as similar at time of submission and which will need another final discrimination process to be applied once the image recognition service (213) returns with an answer needing final resolution.

Either directly as an outcome of the recognition services or through an analytical approach of behavior of recognition service, it happens on many pages that the recognized images are not sufficiently unique in an optical perception of it as an image. The grabbed list of candidates most probably contains the proper one but additional processing is needed to resolve it. Hereafter are explained three additional processes referred to as: "Progressive word-based recognition", "Waterfall based classification" and "Run length based classification" that will work once a resolution is needed. These three processes can be applied sequentially, in parallel, and either started in full or at least partially before the recognition service returns an answer.

Progressive Word-Based Identification

Another system may also embark when an optical similarity exists. In other words, the existing optical similarity service returns more than one image candidates a word based identification method in accordance with an embodiment may be used to refine the search and identify the closest match.

This system may be made of a progressive Optical Character Recognition (OCR) applied on the scanned image of the page. This system may perform comparison of a single word at a time until a single image is (or until a maximum time elapses). Whereby each word is searched against all other words that are known to exist in the page as analyzed during the registration phase when Publisher supply the PDL of the pages.

In the present embodiment, the adapted OCR method uses a classical engine modified so that each time a word is discovered it is compared to the set of candidate pages. As example the Google Tesseract engine with an associated SVM is appropriate for modification to become a progressive analyzer. After a certain amount of words is found, it can be expected that only a single registered page has sufficient similarity of text content while other candidates show dissimilarity.

This progressive OCR method allows to speed up the recognition tremendously, which is a key factor of the user experience because the system becomes of no use and no interest to the user if the results take long time to appear. As opposed to a full OCR analysis that takes a couple of seconds and only returns the results when it has finished identifying all the words, the present modified OCR based method returns the results in a matter of milliseconds because the aim is to identify a given word (or few until a resolution occurs) and not to scan the entire page.

Registration phase (Page indexing): The learning phase includes reading the PDL text of each page. The text is converted to plausible words and proofed against a dictionary. However when a word does not exist, no correction or analysis of the closest word is done, the sequence of character is simply and definitively discarded.

PDL, like PDF, does not always allow to extract exact words from the character stream. Characters can be placed at very precise position for sake of calligraphic rules, and because the display list allows to split drawing of character at different times in the sequence of drawing, this makes the results of word recognition uncertain. This fact is recognized as a defect of the PDF format made for display and not for edition.

When analyzing the PDL a set of rules exist which are very strict to follow. These rules relate to word re-composition in PDL. This approach may miss a few words but enough words would appear.

Another embodiment uses the image out of the Page rasterization module and feeds a classical full feature OCR recognition. This OCR recognition engine will extract text as it can understand it. It may then be appropriate to remove usage of a dictionary and leave it working without assistance of a dictionary. This creates a set of word that are proven to exist in the page. The interest of such approach is to perform a work that is similar to the imaging model and that will be applied during the detection. The penalty being the high resolution needed for OCR on the full page.

Recognition time: The images feed the tailored progressive OCR engine. This text check is very fast and will stop once only one page is left, or after a certain processing time (as said above 500 ms to 1000 ms) if more than one page is left out of this discrimination phase then other measure is taken as described below.

It must be noted that this step may embark regardless of the image outcome, in parallel to other steps for sake of speed and improved user experience. The recognition anticipates and stores words waiting for image recognition to return the subset of page which allows to progressively compare words starting with accumulated work.

In every cases, either the step finishes with a single page or will at least shorten the subset of candidate images.

Waterfall Path Based Identification

In an embodiment, the system may perform the similarity test based on the pattern made by the space between words and end of lines, as described herein below.

The principle uses a paragraph overall aspect analysis.

The preliminary step is in determining a paragraph. Some arbitrary rules are used that focus on global document detection looking at the dispersion with space vertically and horizontal, identifying a relation between pure white and non-white space, to find interlines, considering a paragraph to start when a major interline space is found, with a height that are above previous estimated line height, and same for width with a consideration on start of text that are in most of the case justified.

Another embodiment for identifying the paragraph includes using the information extracted during the PDL analysis for identifying the bounding box delimiting the paragraph. Portion of the image representing the bounding box is then sent for further analysis and detection to the paragraph detection module which is described in further detail below. In the present case, the paragraph identification will be performed based on the set of images received form the image recognition service which outputs a list/subset of potential image candidates. As opposed to the previous paragraph detection embodiment is that it can only be done once answer about potential candidate, single or many is received form the image recognition service (e.g. Qualcom Vuforia).

As the case maybe the paragraph analyzer may embark a set of real paragraphs, as the example shown in FIG. 7a. However the purpose of the analysis is optical detection and not decoding of text.

Image Processing

A series of transformations are sequentially applied on FIG. 7a. A Hough transformation is applied, as shown in FIG. 7b to find the accumulation point to determine horizontality. Then, image rotation to correct horizon and some perspective is applied. The next step is to determine the interline spacing which represents roughly 10% of the height of the black lines which represent the characters size.

Scene Segmentation

As shown in FIG. 7c, a Vertical Kernel is applied to expand the types on the vertical axis using an expansion radius of 60% of the line spacing, followed by thresholding the image on 4 levels. The next steps is to reapply a vertical kernel for growth on vertical axis only for 60% of interline. The last step of the scene segmentation is to remove any single pixel skeleton.

Figure 7D:
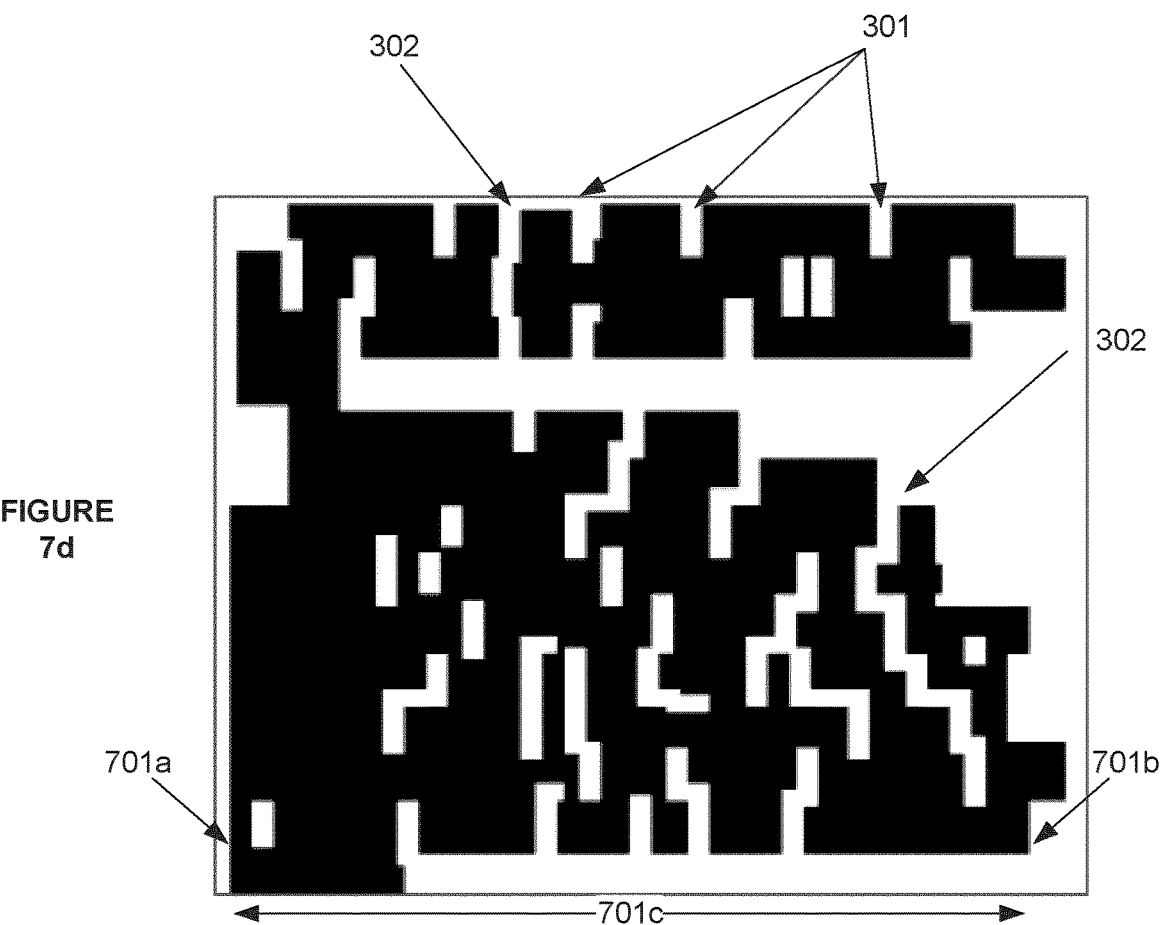
Figure 7E:
FIGS. 7e to 7h illustrate an example of a method for refining image identification using a paragraph based pattern recognition.

Feature Extraction:

With reference to FIG. 7d, this step involves inserting a "Rolling bowl" algorithm that considers a path of a size which is big enough to leave a virtual rolling ball of 20% of interline spacing run through all plausible space. This expands some path and discards higher frequency path. Leaving a set of plausible path like 301 and 302 etc. . . . .

The resulting features set are made of two categories:

Position of end of line relative to beginning of line; (701)(*c*),(701*a*);(701*b*)

Path which vertical length exceed 1.5 interline spacing (302)(*a*).

Other small path are discarded as a features. Like (301)

This defines a features set that should now be analyzed to find which page it belong to and eventually where in that page.

Classification.

Final classification involves aggregation of probability of matching, the principle of final aggregation incorporates aggregation that also reflects the density of probability and uses Neyman-Pearson Lemma for final probability estimate. The result may deliver a most probable candidate as well as a sorted list of others.

A final discrimination is applied that uses the reading context. For example the same advertisement published in two different media may have extremely similar aspect, but the context of the publication estimation like detection of editorial part, will help doing final discrimination.

The main embodiment incorporates aggregation of probability coming out of all detector including the image recognition weighted by the rating of uniqueness as delivered by the image recognition services, and add at least two others detection made of:

Maze path analysis; and

Run length pattern analysis.

Both deliver a probability of match as the hit versus the other pattern in the database.

The detector is used at indexing time in the same way as it will be used during run time, so that each potential paragraph or tile is checked against existing one. This in turn delivers a degree of difference based on imaging distances either by an image norm like a Manhattan distance for image to image or as a Levenshtein distance for features made or segment chain or run-length as described hereafter.

Maze Analysis Classification:

The first step in the maze classification analysis is to perform a frequency low pass filtering to start analysis of major trends in the paragraphs.

The second step starts when the low frequency is extracted, then a kernel is used to remove all single pixel elements, as well as horizontal single pixel lines. Such processing result in image as per FIG. 7f.

The next step is to identify all plausible paragraph patterns as referenced with same process during image indexing. The pattern determined during the indexing phase is to first search for in the existing set of patterns, otherwise it is added to it. Each pattern is an index to a series of finer features such as features (501)-(504) shown in FIG. 7g that will be explained later and used to refine multiple result or fuzzy result.

Two embodiments may exist to identify this low pass version of paragraph.

Figure 7F:

Path detection: it Searches for vertical features made of vertical transition as (520) shown in FIG. 7f.

Pattern detection: it uses a simple image similarity algorithm for example non-limitatively the "OpenCV Template matching" which is acceptable in terms of accuracy and speed.

The low pass image is a about 24×24 pixels; The number of paragraph in a text is about 7/pages in a book and 40/pages in newspaper which give a database of about 2100 for a book with 300 pages and about 2000 for a newspaper of 48 pages, for 10000 books or newspaper it give a potential 20 Million paragraph, hence the size of the pattern set.

A very simple pre-selection done using the ratio of pixels Hollow/total give rounded to about 48 categories show that it give a first speed improvement by a factor of about 8 (not 48 because the dispersion of paragraph is not a linear distribution of the considered ratio. 10 ratios group about 60% of patterns). With a few other selection improvement the pattern matching is done within a 100 ms on the server, which allows to start the phase four in a reasonable time.

Forth step: Consider the medium frequency processed images in FIG. 7g. The purpose is to find pseudo segments that are continuous either from top of estimated paragraph or bottom of paragraph, until finding a disruption in the verticality or edge of paragraph. Segments are tried to be established using an horizontal step equal to the width of the interspacing as estimated by the average of width of interspacing—15%. (501)-(504),(510) are samples of such pseudo segment. Classification occurs on these segments used as a sub-feature set.

Fifth step: This phase performs a final classification of line patterns to find the candidates in the image. Various methods exist in the field of pattern identification. Either through frequencies analysis or an analysis of length of vertical segments.

A classification implemented in an embodiment include an analysis of length of vertical segment as per FIG. 7d and their proximity. The purpose is to create a consistent chain of segments and compare it to the existing chain determined during image indexing. Another embodiment can use a certified successful recognition to learn any new chain and then improve the quality of the segment chain database.

The speed of the final process of comparing the chain to existing chain is improved because the chain follows a certain progression, leaving more uncertainties by the end of the chain. And the process consider segment of long length first so that a sorting is possible which allow a divide and conquer method to find result bounded in a O(Log m Log n) where n=number of learned chains and m is the average chain length.

Such a chain construction starts with righter most longer segment first. Once the segment scan arrive on left side of segment but some segment have not been considered because a being right of another one of same size, like (501b) versus (501a) then this segment is inserted in the chain and the same scan right to left principle re-start and the process continue until all segments are in the chain.

Figure 7G:
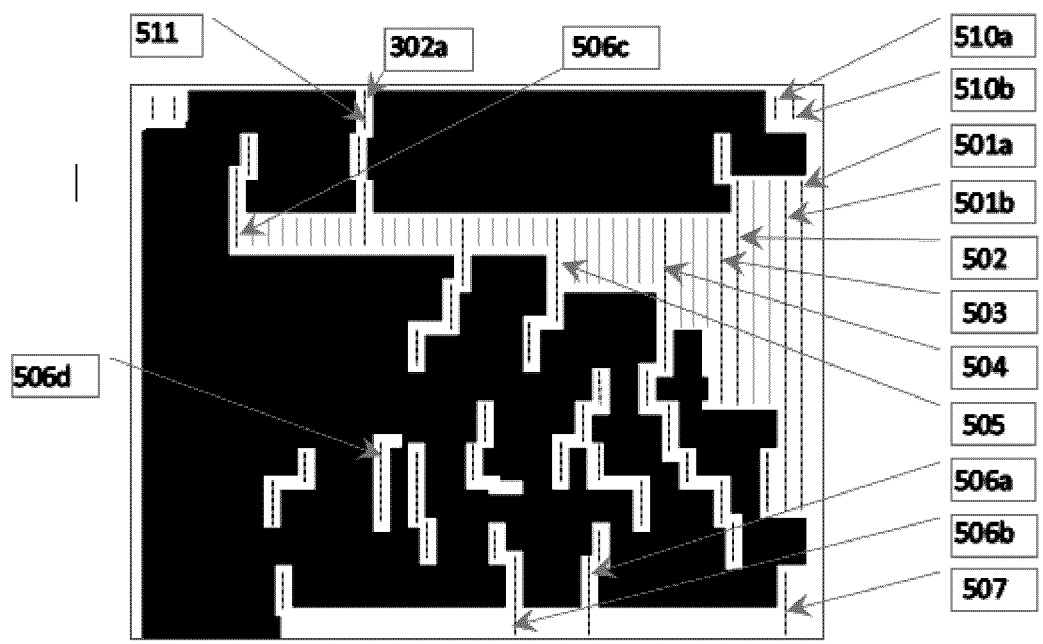

As exemplified in FIG. 7g, the longest segment found is (501a), then a search is done for the biggest immediately left segment of different size segment like (502a) then (503),the (504) then (505) then (506a) etc. until smallest found, then back from right (501b) then (506b) etc. . . . and so on until all tiles segments are considered.

Chain of segments that have a consistency of presence, the relation of size and their starting point from top is a strong sign that the proper paragraph had been recognized.

The next steps find a chain in a database that has the most coincidence of segments. Deciding how many mini segments is needed to allow for extracting a plausible set of candidates including a ranking and extract the positioning information (pages and position in page) as well as the associated document.

If a paragraph goes beyond a certain limit in terms of covered area, a good value is 40% of scanned area, the frequency analysis gives a clue about an overzealous aggregation of text. Then the paragraph analysis can fall back to a tile oriented method where paragraph will be arbitrarily determined as a certain percentage of height and width of scanned document. This can even be applied to the overall document set as the indexing may analyze that most pages are not suited for paragraph analysis.

Otherwise said, all documents can be considered as made of pages as images that are tiled using a tiling index across pages. The sizes of a tile is organized to allow about 10×10 character by tiles, or about ¼ of inches of pages for a Tabloid newspaper. These sizes are subject to adjustment depending upon the purposed and are just mention for exemplary purposes. The classification will then consist of identifying which tiles set are plausible for a paragraph and then extract from the tiles set the area that are consistent with a approach based on pertinence of tiles once sorted by pages. This process first considers each segment and index which tiles contains such a segment. When a segment cross a tile boundary the segment is considered in its entirety.

Otherwise said a segment may start or end in a tile, but may end or start in another tiles.

The analysis of all segment of FIG. 7a will first deliver a series of tiles and their frequency of plausibility. Otherwise said how many time each tiles is found as containing a segment.

Run Length Classification

Figure 7H:
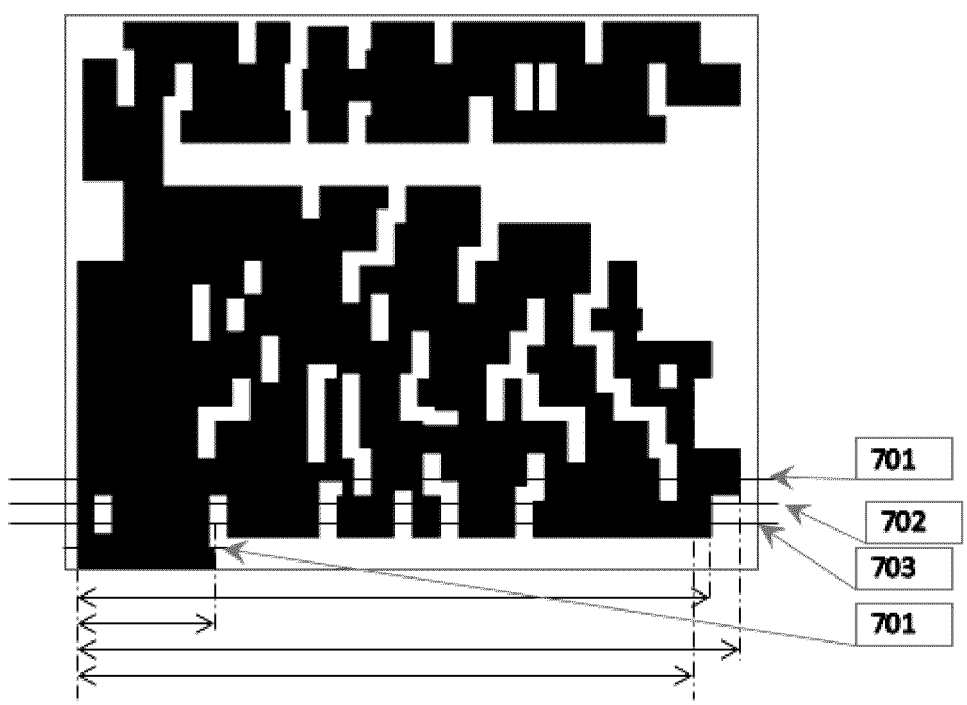

The second method uses a pattern analysis of run length as the alternance of black and white on a horizontal line as indicated by 701 shown in FIG. 7*h*.

The paragraph or tile's first and last non-white area determine a horizontal distance. This set of values then become a sub-features set that can be classified by finding which paragraph belong to a combination thereof in the order decided, here from bottom to top. This is exemplified on FIG. 7*d* where only a few run-length are drawn for sake of clarity. This first one is taken from the longest one (701), and set as a percentage of paragraph.

All other segments are taken as percentage of first run-length. The precision of paragraph bounding is not as high as the precision of run-length, this is why the analysis will consider a higher tolerance on first segment versus paragraph, than each segment between them. The search tree is preset during image indexing and is a sorted tree after length of run-length.

FIG. 8 is a flowchart describing the general function of the robot module embedded within the server.

FIG. 9 is a flowchart describing the function of the robot in detail.

Figure 10:
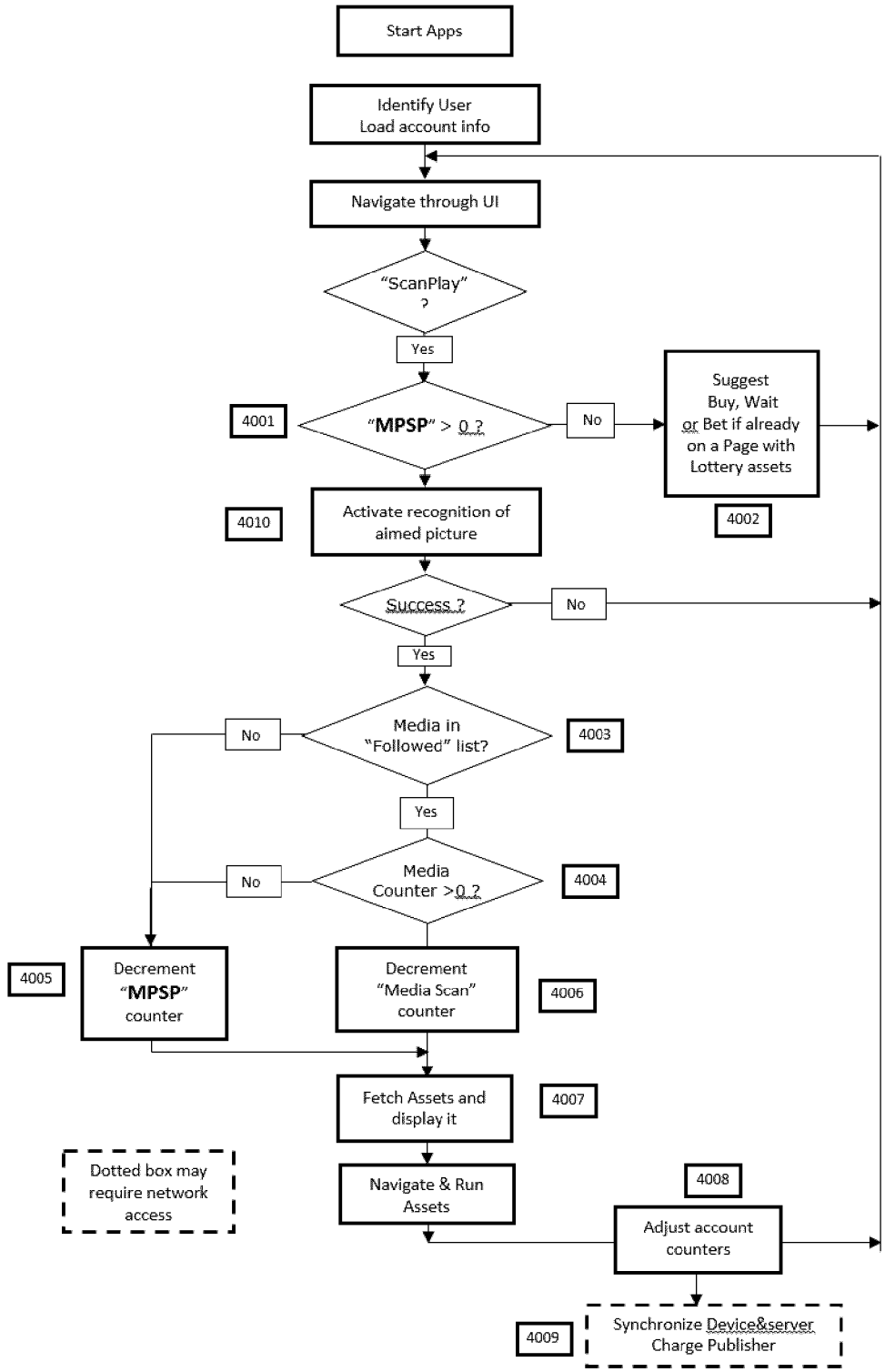
FIG. 10 is flowchart describing the functionality performed by the app on the user's device.

FIG. 10 is flowchart describing the functionality performed by the app on the user's device.

Figure 11:
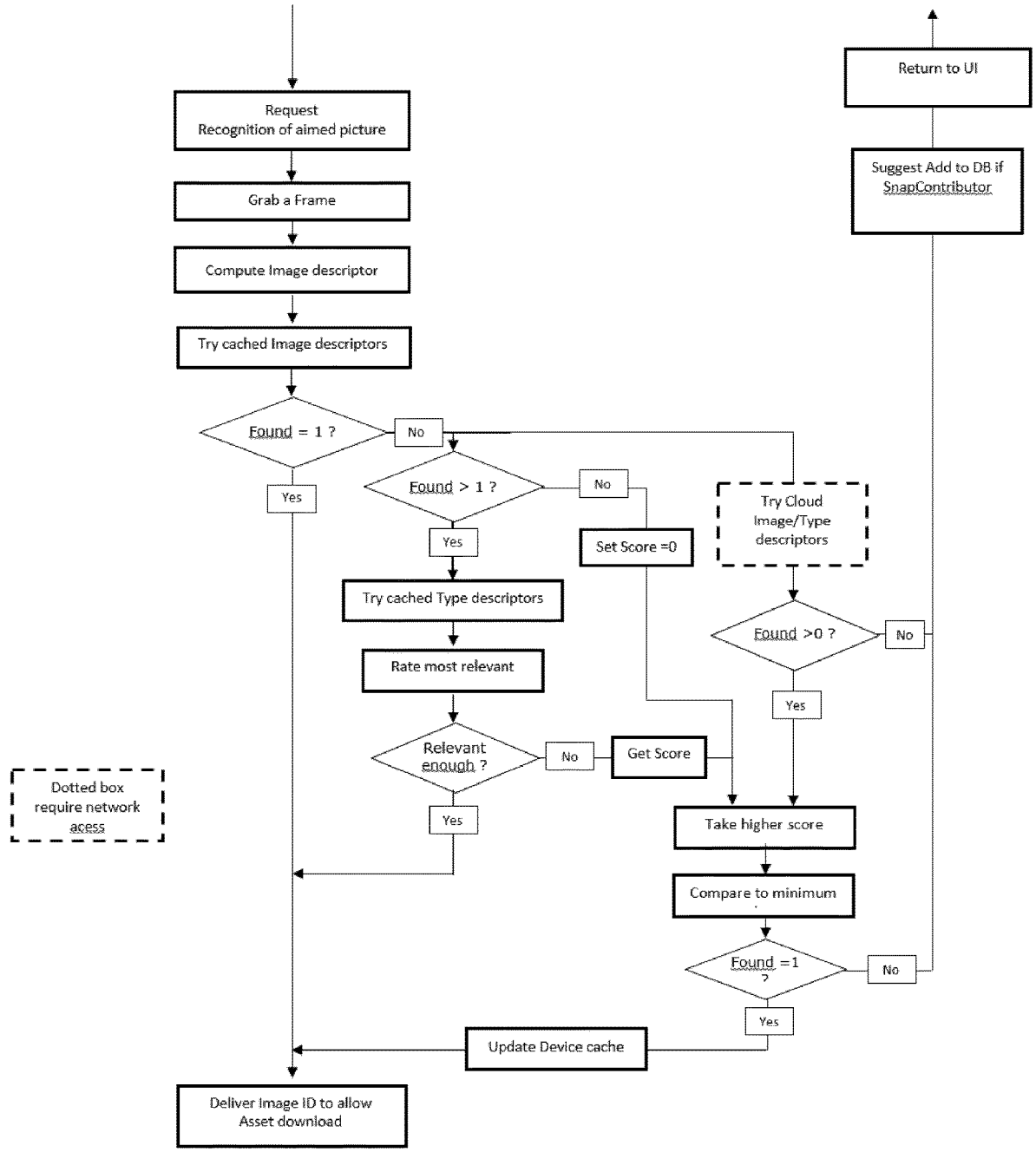
FIG. 11 is a flowchart describing the image recognition process performed by the second robot after a comparison request when receiving an image from the mobile device.

FIG. 11 is a flowchart describing the image recognition process performed by the second robot after a comparison request when receiving an image from the mobile device.

Figure 12:
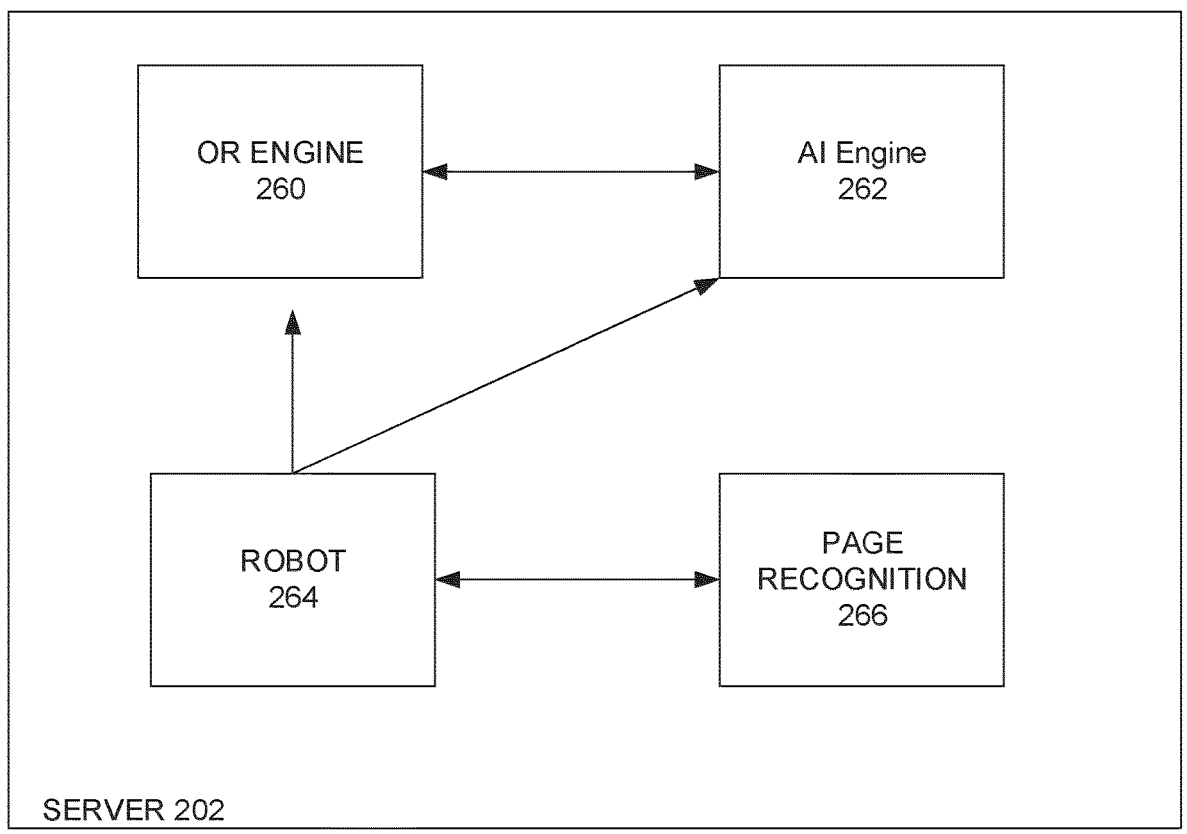
FIG. 12 is block diagram illustrating the major modules inside the server.

FIG. 12 is block diagram illustrating the major modules inside the server. As shown in FIG. 12, the server 202 comprises an operational research engine 260, an artificial intelligence engine 262, a robot (second robot) 264, and a page recognition module 266.

The second robot 264 is in charge of managing the activities between the different modules including activities handled by the robot itself including processing of PDLs, generation of assets, addition of pre-generated assets into the list of assets to send or associate with a given image, management of user accounts and counters; management of fame score associated with assets, pages, publications and asset makers, performing searches using remote search engines, creation of assets based on the search results and triggering the OR engine and the AI engine, and the page recognition module 266.

The OR engine 260 is in charge of balancing the dynamics of the game to make the user experience a fair play by dynamically increasing rewards on assets, as well as dynamically decreasing fame of users when they do not play. The OR engine 260 may as discussed above implement a time-sensitive propagation equation for spreading the reputation of an asset to its page and its asset maker.

The AI engine 262 is in charge of decisions requiring intelligence including simulating users and playing against high ranked players for reducing their impact on other players. The AI engine receives information from OR engine about the target/goal to achieve and reports to the OR engine with achieved performance.

The page recognition module 266 is in charge of finding the best candidate image from a list of pre-store and pre-processed images of pages stored in the database 204. As discussed above, the engine 266 may use available services such as Qualcom Vuforia or the like and then refines the results received by the available service to find the best matching candidate image using one or more of refining embodiments discussed above.

In a non-limiting example of implementation, users may also be allowed to participate collectively as well as individually into the improvement and enrichment of the information related to a published document. The principal actor and role being the generator of Content. The secondary actors may include: Simple Reader of Content, Interactive Reader who are expected to use it in a play mode close to a game. The principle may manage three main scores specific to each user, resulting from discoveries of information of a certain importance within the enriched document. The game aspect may use a success on such discovery process to raise scores, and inversely there is a penalty for a user if the user fails to find it.

Figure 13:
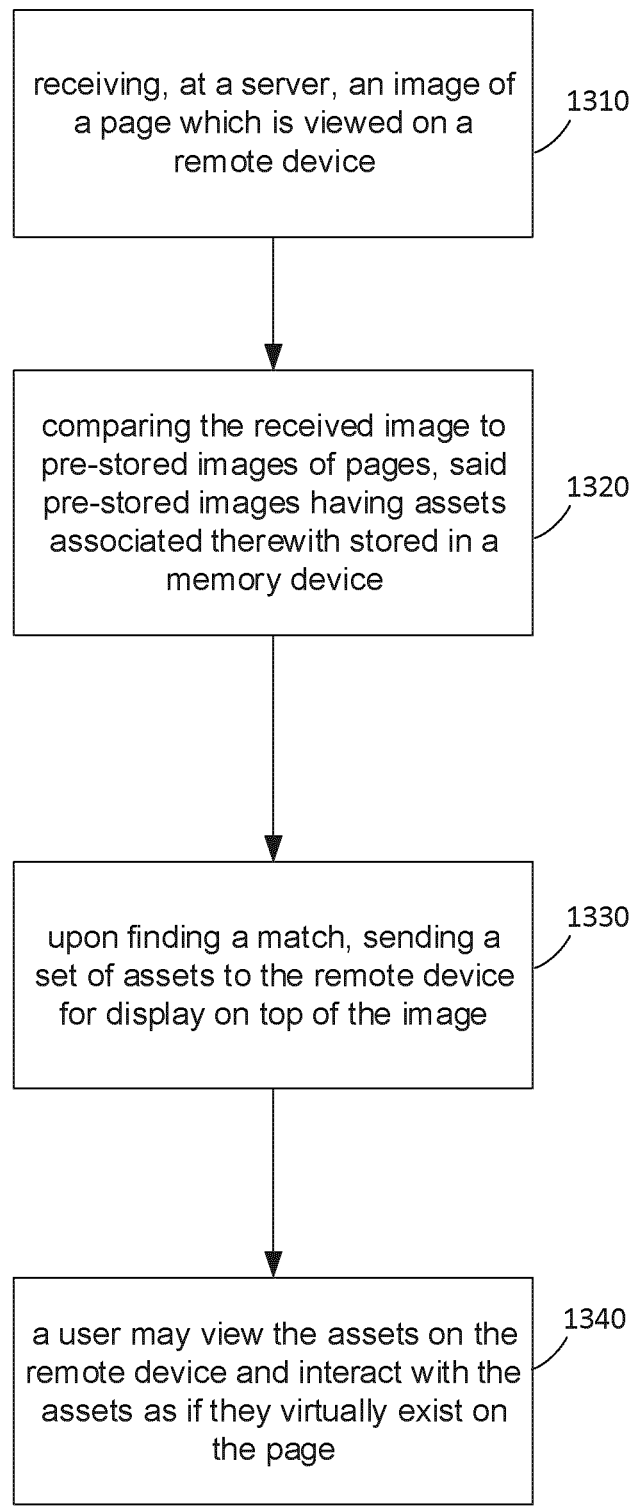
FIGS. 13 to 14 are flowcharts illustrating two embodiments of a method for providing augmented reality interactions over printed media.

As shown in FIG. 13, there is provided a computer implemented method for providing augmented reality interactions over printed media. The method comprises: receiving, at a server, an image of a page which is viewed on a remote device (step 1310); comparing the received image to pre-stored images of pages, said pre-stored images having assets associated therewith stored in a memory device (step 1320); upon finding a match, sending a set of assets to the remote device for display on top of the image (step 1330); whereby a user may view the assets on the remote device and interact with the assets as if they virtually exist on the page (step 1340).

Figure 14:
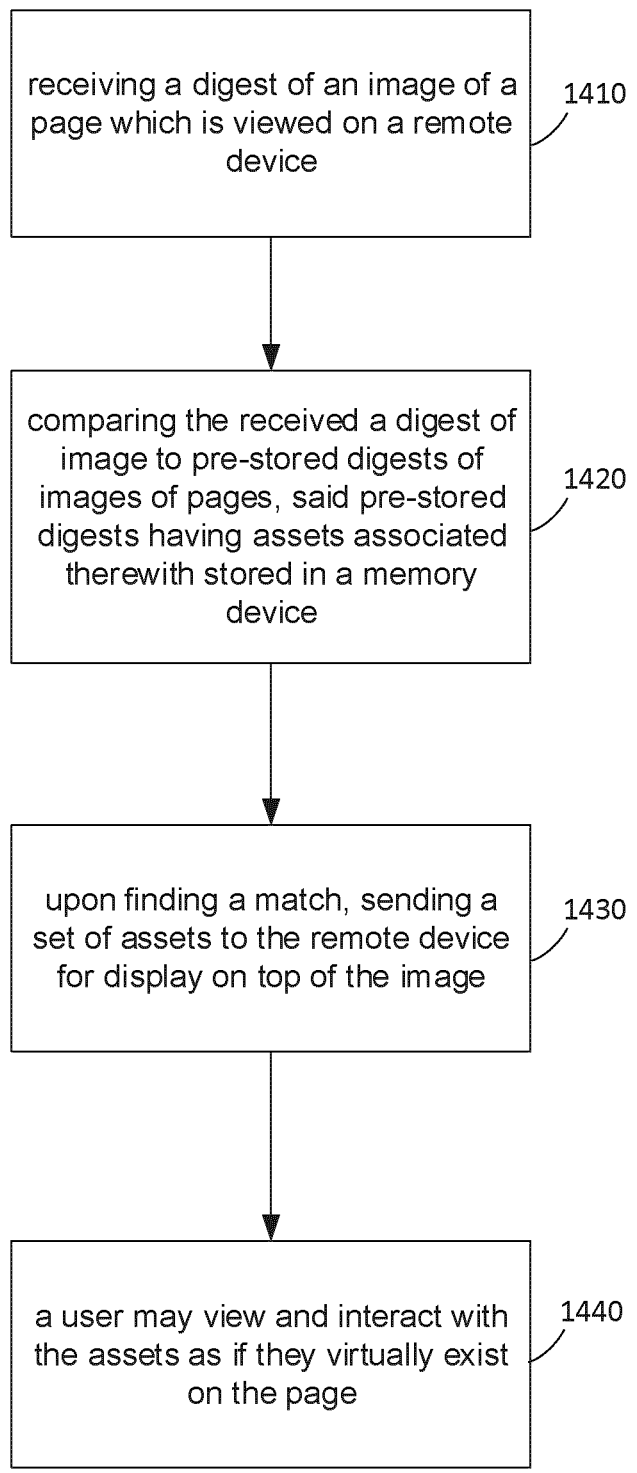

As shown in FIG. 14, there is provided a computer implemented method for providing augmented reality interactions over printed media. The method comprises: receiving a digest of an image of a page which is viewed on a remote device (step 1410); comparing the received a digest of image to pre-stored digests of images of pages, said pre-stored digests having assets associated therewith stored in a memory device (step 1420); upon finding a match, sending a set of assets to the remote device for display on top of the image (step 1430); whereby a user may view and interact with the assets as if they virtually exist on the page (step 1440).

Figure 15:
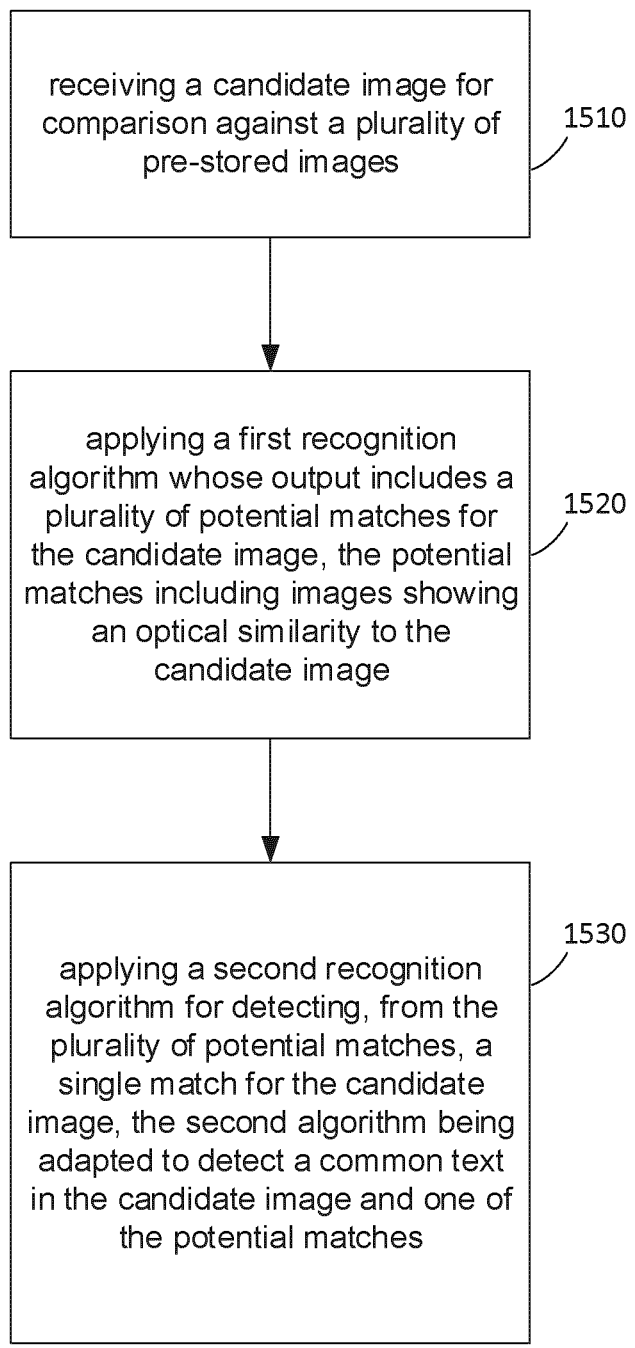
FIGS. 15 to 16 are flowcharts illustrating two embodiments of a method for image recognition.

As shown in FIG. 15, there is provided a computer implemented method for image recognition. The method comprises: receiving a candidate image for comparison against a plurality of pre-stored images (step 1510); applying a first recognition algorithm whose output includes a plurality of potential matches for the candidate image, the potential matches including images showing an optical similarity to the candidate image (step 1520); applying a second recognition algorithm for detecting, from the plurality of potential matches, a single match for the candidate image, the second algorithm being adapted to detect a common text in the candidate image and one of the potential matches (step 1530).

Figure 16:
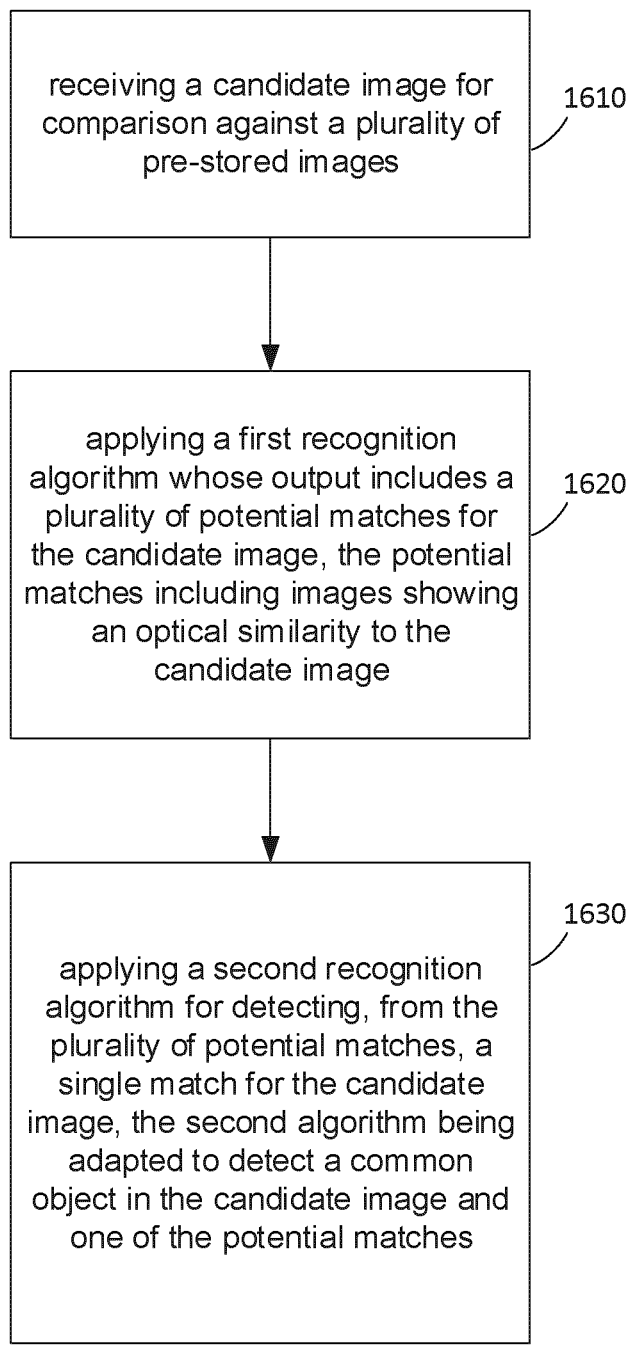

As shown in FIG. 16, there is provided a computer implemented method for image recognition. The method comprises: receiving a candidate image for comparison against a plurality of pre-stored images (step 1610); applying a first recognition algorithm whose output includes a plurality of potential matches for the candidate image, the potential matches including images showing an optical similarity to the candidate image (step 1620); applying a second recognition algorithm for detecting, from the plurality of potential matches, a single match for the candidate image, the second algorithm being adapted to detect a common object in the candidate image and one of the potential matches (step 1630).

Network and Operating Environment

Figure 17:
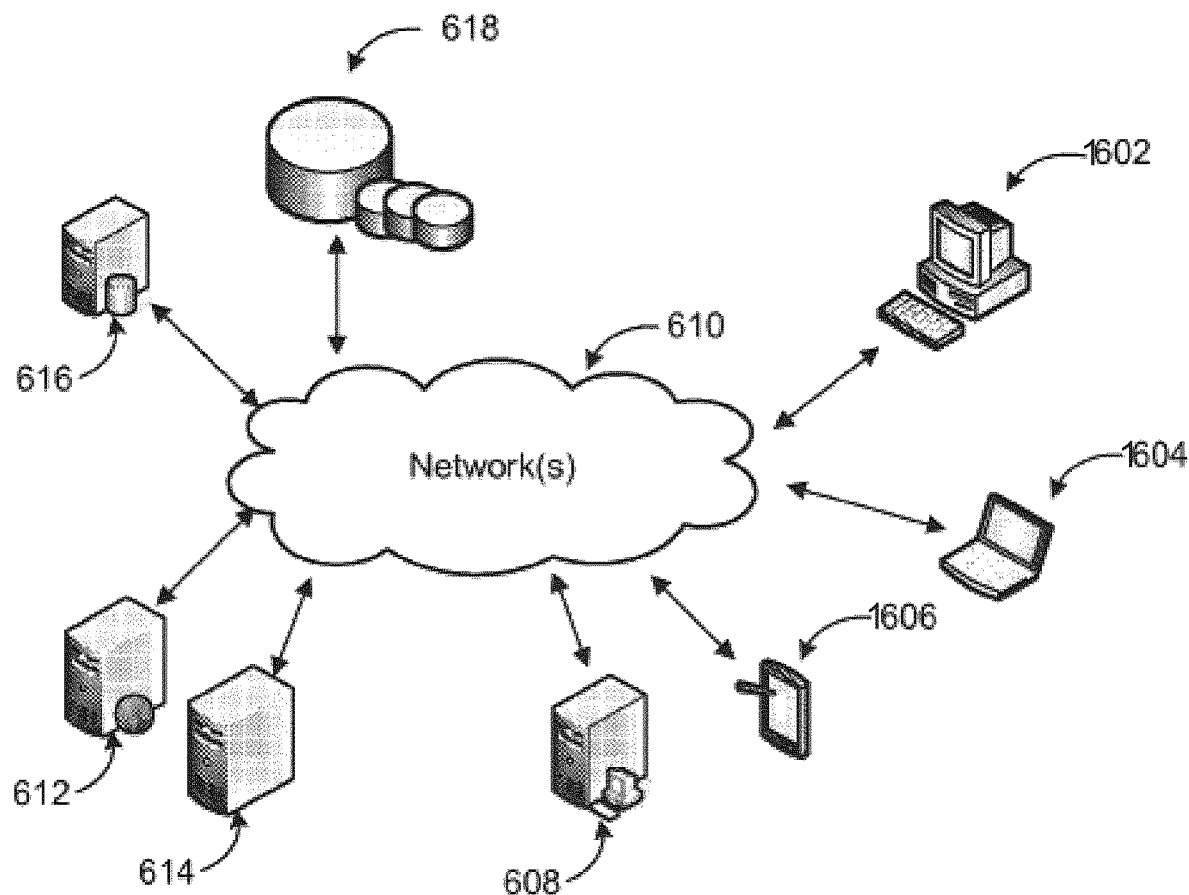
FIG. 17 is a block diagram illustrating an exemplary networked environment, where embodiments may be implemented.

FIG. 17 is an example networked environment, where embodiments may be implemented. Extensible multi-tenant service systems may be implemented in a distributed manner over a number of physical and virtual clients and servers. They may also be implemented in un-clustered systems or clustered systems employing a number of nodes communicating over one or more networks (e.g. network(s) 610).

Such a system may comprise any topology of servers, clients, Internet service providers, and communication media. Also, the system may have a static or dynamic topology. The term "client" may refer to a client application or a client device. While a networked system implementing extensible multi-tenant services may involve many more components, relevant ones are discussed in conjunction with this figure.

Requests for access may come from tenants using individual client devices 1602-1606 or application server 608 in a networked multi-tenant system. The client device may be one of desktops, laptops, IPADS, IPhones, smart phones, or any computing device having an operating system which can implement the present embodiment.

Such a system may also be implemented, in one or more servers (e.g. servers 612, 614) and accessed by the client devices (or applications). One or more web servers (physical or virtual) such as web server 612 may receive the requests and direct them to the appropriate resource. The resources may include scalable server clusters with synchronous and asynchronous server, organization databases, and other components.

Organization databases may be embodied in a single data store such as data store 618 or distributed over a number of data stores. Dedicated database servers (e.g. database server 616) may be used to coordinate data retrieval and storage in one or more of such data stores.

Network(s) 610 may include a secure network such as an enterprise network, an unsecure network such as a wireless open network, or the Internet. Network(s) 610 provide communication between the nodes described herein. By way of example, and not limitation, network(s) 610 may include wired media such as a wired network or direct-wired connection, and wireless media such as acoustic, RF, infrared and other wireless media.

Many other configurations of computing devices, applications, data sources, data distribution systems may be employed to implement an extensible multi-tenant service platform. Furthermore, the networked environments discussed in FIG. 17 are for illustration purposes only. Embodiments are not limited to the example applications, modules, or processes.

Figure 18:
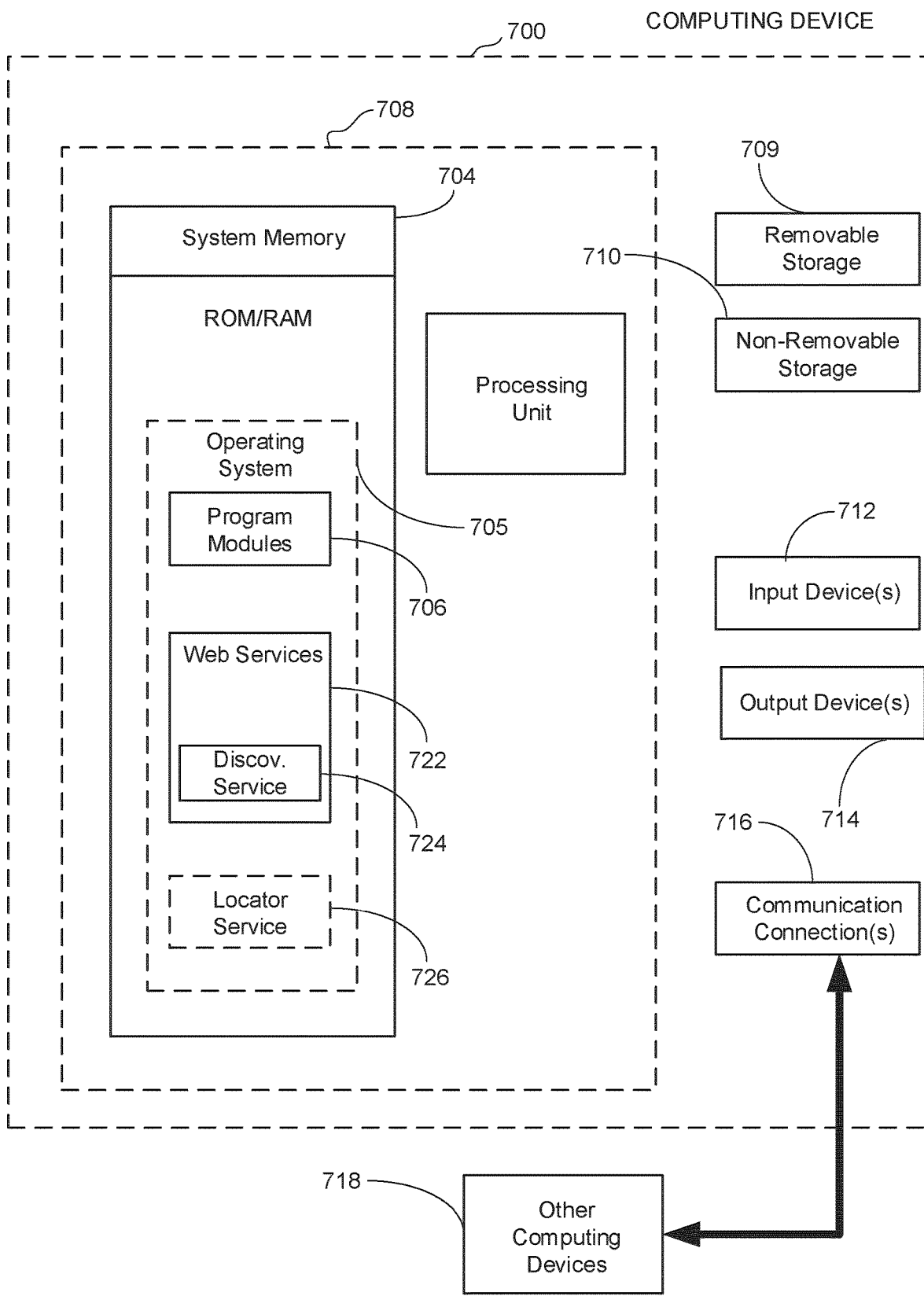
FIG. 18 is a block diagram illustrating an exemplary computing environment.

FIG. 18 and the associated discussion are intended to provide a brief, general description of a suitable computing environment in which embodiments may be implemented. With reference to FIG. 18, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of a networked personal computer, such as the WINDOWS® operating systems from MICROSOFT CORPORATION of Redmond, Wash. The system memory 704 may also include one or more software applications such as program modules 706, Web services 722, a discovery service 724 within web services 722, and an optional locator service 726.

Web services 722 may be a separate application or an integral module of a hosted multi-tenant service platform that provides data and processing services to client applications associated with computing device 700. Discovery service 724 may provide location and configuration information associated with individual organization (tenant) services to a client requesting access to those. Optional locator service 726 may provide services associated with determining a purpose of the service and which databases to use for web servers, as well as asynchronous processing servers, as described previously. This basic configuration is illustrated in FIG. 18 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 3 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer implemented method for image recognition, comprising:

Receiving a candidate image for comparison against a plurality of pre-stored images;

Applying a first recognition algorithm whose output includes a plurality of potential matches for the candidate image, the potential matches including images showing an optical similarity to the candidate image;

Applying a second recognition algorithm for detecting, from the plurality of potential matches, a single match for the candidate image, the second recognition algorithm being adapted to detect a common text in the candidate image and one of the potential matches;

wherein the second recognition algorithm uses a paragraph based pattern recognition adapted to detect the single match for the candidate image based on a presence of a paragraph having the same pattern in the candidate image and one of the potential matches, and wherein the paragraph based pattern recognition comprises:

identifying a paragraph of text within the image;

processing a section of the image delimiting the paragraph to find major word spaces and line endings;

converting the pattern and line endings to a digital description that allows for searching pre-stored similar digital descriptions;

wherein searching for pre-stored digital descriptions comprises applying a local sensitivity hashing method for identifying a closest match for the pattern of the paragraph.

2. The method of claim 1, further comprising beginning application of the second recognition algorithm once at least one potential match of the plurality of potential matches is output from the first recognition algorithm.

3. The method of claim 2, wherein the first recognition algorithm is an image recognition service provided by a third entity.

4. The method of claim 1, wherein the first recognition algorithm is an image recognition service known as Qualcomm Vuforia.

5. A computer implemented method for image recognition, comprising:

Receiving a candidate image for comparison against a plurality of pre-stored images;

Applying a first recognition algorithm whose output includes a plurality of potential matches for the candidate image, the potential matches including images showing an optical similarity to the candidate image;

Applying a second recognition algorithm for detecting, from the plurality of potential matches, a single match for the candidate image, the second recognition algorithm being adapted to detect a common object in the candidate image and one of the potential matches;

wherein a distortion is applied to the candidate image before comparing it to the pre-stored images, to compensate for natural curvature of flexible medium aimed at, wherein the distortion pattern is inverted using interpolation image distortion where nodes of an interpolation net are accumulation points of a Hough transform.

6. The method of claim 5, wherein the second recognition algorithm uses a paragraph based pattern recognition, the second recognition algorithm being adapted to select the single match for the candidate image based on a presence of a paragraph having the same pattern in the candidate image and one of the potential matches.

7. The method of claim 6, wherein the paragraph based pattern recognition comprises:

identifying a paragraph of text within the image;

processing a section of the image delimiting the paragraph to find major word spaces and line endings;

converting the pattern and line endings to a digital description that allows for searching pre-stored similar digital descriptions.

8. The method of claim 7, wherein searching for pre-stored digital descriptions comprises applying a local sensitivity hashing method for identifying a closest match for the pattern of the paragraph.

9. The method of claim 5, wherein the second recognition algorithm uses a word based recognition, the second recognition algorithm being adapted to select the single match for the candidate image based on a presence of same words in the candidate image and in a PDL of the potential matches.

10. The method of claim 5, wherein the second recognition algorithm uses a coarse character based recognition, the second recognition algorithm being adapted to select the single match for the candidate image based on a presence of a coarse recognition of character shapes in the candidate image and in a PDL of the potential matches.

11. The method of claim 5, wherein the second recognition algorithm uses an aspect of separation based recognition, the second recognition algorithm being adapted to select the single match for the candidate image based on a presence of similar separations between words of a given paragraph in the candidate image and in a PDL of the potential matches.

12. The method of claim 11, wherein analyzing a separation between words is done on a line by line basis, looking downward of a current line and its word spaces to examine relative position of nearest word spacing on another line below the current line.

13. The method of claim 5, wherein the second recognition algorithm analyzes a relative length of an alternance of words like and space like patterns on a line or a group of lines, such alternance defining a unique pattern that is searched for in the potential matches to select the single match.

14. The method of claim 5, wherein each candidate image that is overexposed is diagnosed using a frequency analysis in a low saturation area to determine an ellipsoidal shape of gradient of saturation where a frequency analysis has a predominance of low frequencies which allows to adjust parameters that fit a best ellipsoid matching theses low frequencies and where this ellipsoid allows to determine a tonal correction in this area.

15. The method of claim 14, wherein the tonal adjustment is replaced by a whitening of the zone to decrease creation of features that would wrongfully be interpreted or used by the first image recognition algorithm.

16. The method of claim 14, wherein the parameter needed for the tonal adjustment is analyzed to determine that a warning should be sent to the user requesting for a better pickup of the candidate image.

17. The method of claim 5, further comprising beginning to apply the second recognition algorithm once at least one potential match of the plurality of potential matches is output from the first recognition algorithm.

18. A computing device having access to computer readable instructions for implementing the method of claim 5.

19. A computer implemented method for image recognition, comprising:

Receiving a candidate image for comparison against a plurality of pre-stored images;

Applying a first recognition algorithm whose output includes a plurality of potential matches for the candidate image, the potential matches including images showing an optical similarity to the candidate image;

Applying a second recognition algorithm for detecting, from the plurality of potential matches, a single match for the candidate image, the second algorithm being adapted to detect a common text in the candidate image and one of the potential matches;

wherein the second recognition algorithm uses an aspect of separation based recognition, the second recognition algorithm being adapted to select the single match for the candidate image based on a presence of similar separations between words of a given paragraph in the candidate image and in a PDL of the potential matches, and wherein analyzing a separation between words is done on a line by line basis, looking downward of a current line and its word spaces to examine relative position of nearest word spacing on another line below the current line.

20. A computer implemented method for image recognition, comprising:

Receiving a candidate image for comparison against a plurality of pre-stored images;

Applying a first recognition algorithm whose output includes a plurality of potential matches for the candidate image, the potential matches including images showing an optical similarity to the candidate image;

Applying a second recognition algorithm for detecting, from the plurality of potential matches, a single match for the candidate image, the second algorithm being adapted to detect a common object in the candidate image and one of the potential matches;

wherein the second recognition algorithm analyzes a relative length of an alternance of words like and space like patterns on a line or a group of lines, such alternance defining a unique pattern that is searched for in the potential matches to select the single match.

21. A computer implemented method for image recognition, comprising:

Receiving a candidate image for comparison against a plurality of pre-stored images;

Applying a first recognition algorithm whose output includes a plurality of potential matches for the candidate image, the potential matches including images showing an optical similarity to the candidate image;

Applying a second recognition algorithm for detecting, from the plurality of potential matches, a single match for the candidate image, the second algorithm being adapted to detect a common object in the candidate image and one of the potential matches;

wherein each candidate image that is overexposed is diagnosed using a frequency analysis in a low saturation area to determine an ellipsoidal shape of gradient of saturation where a frequency analysis has a predominance of low frequencies which allows to adjust parameters that fit a best ellipsoid matching theses low frequencies and where this ellipsoid allows to determine a tonal correction in this area.

* * * * *